US012082221B2

(12) United States Patent
Takeda et al.

(10) Patent No.: US 12,082,221 B2
(45) Date of Patent: Sep. 3, 2024

(54) RECEIVING PHYSICAL DOWNLINK CONTROL CHANNELS FOR MULTICAST AND BROADCAST SERVICES AT MONITORING OCCASIONS

(71) Applicant: QUALCOMM Incorporated, San Diego, CA (US)

(72) Inventors: Kazuki Takeda, Tokyo (JP); Le Liu, Fremont, CA (US); Alberto Rico Alvarino, San Diego, CA (US); Ayan Sengupta, San Diego, CA (US); Prasad Reddy Kadiri, San Diego, CA (US); Umesh Phuyal, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 17/443,884

(22) Filed: Jul. 28, 2021

(65) Prior Publication Data

US 2023/0030951 A1 Feb. 2, 2023

(51) Int. Cl.
*H04W 72/30* (2023.01)
*H04W 24/08* (2009.01)
(Continued)

(52) U.S. Cl.
CPC ........... *H04W 72/30* (2023.01); *H04W 24/08* (2013.01); *H04W 72/0446* (2013.01);
(Continued)

(58) Field of Classification Search
CPC . H04W 72/30; H04W 24/08; H04W 72/0446; H04W 72/0453; H04W 72/0466;
(Continued)

(56) References Cited

U.S. PATENT DOCUMENTS

2021/0037500 A1 2/2021 Liu et al.
2022/0029659 A1* 1/2022 Liu ..................... H04B 1/7143

FOREIGN PATENT DOCUMENTS

WO WO-2020059721 A1 3/2020

OTHER PUBLICATIONS

International Search Report and Written Opinion—PCT/US2022/074141—ISA/EPO—Nov. 25, 2022.

* cited by examiner

*Primary Examiner* — Dady Chery
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication that indicates whether a common search space (CSS) is associated with a first type of physical downlink control channel (PDCCH) or a second type of PDCCH. The first type of PDCCH may correspond to a cell-broadcast PDCCH and the second type of PDCCH may correspond to a UE-specific PDCCH. The CSS may be for downlink control information (DCI) with a cyclic redundancy check scrambled by a group radio network temporary identifier (G-RNTI) that schedules a multicast and broadcast service (MBS). The UE may receive, from the base station, the first type of PDCCH or the second type of PDCCH. Numerous other aspects are described.

30 Claims, 14 Drawing Sheets

(51) Int. Cl.
*H04W 72/044* (2023.01)
*H04W 72/0446* (2023.01)
*H04W 72/0453* (2023.01)
*H04W 72/23* (2023.01)

(52) U.S. Cl.
CPC ... *H04W 72/0453* (2013.01); *H04W 72/0466* (2013.01); *H04W 72/23* (2023.01)

(58) Field of Classification Search
CPC ........ H04W 72/23; H04L 5/001; H04L 5/005; H04L 5/0058; H04L 5/0094; H04L 5/0053
See application file for complete search history.

RECEIVING PHYSICAL DOWNLINK CONTROL CHANNELS FOR MULTICAST AND BROADCAST SERVICES AT MONITORING OCCASIONS

FIELD OF THE DISCLOSURE

Aspects of the present disclosure generally relate to wireless communication and to techniques and apparatuses for receiving physical downlink control channels (PDCCHs) for multicast and broadcast services (MBSs) at monitoring occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a base station, an indication that indicates whether a common search space (CSS) is associated with a first type of physical downlink control channel (PDCCH) or a second type of PDCCH, wherein the first type of PDCCH corresponds to a cell-broadcast PDCCH and the second type of PDCCH corresponds to a UE-specific PDCCH, and wherein the CSS is for downlink control information (DCI) with a cyclic redundancy check (CRC) scrambled by a group radio network temporary identifier (G-RNTI) that schedules a multicast and broadcast service (MBS); and receive, from the base station and based at least in part on the indication, the first type of PDCCH or the second type of PDCCH at a monitoring occasion associated with the CSS.

In some implementations, an apparatus for wireless communication at a base station includes a memory and one or more processors, coupled to the memory, configured to: transmit, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and transmit, to the UE and based at least in part on the indication, the first type of PDCCH or the second type of PDCCH at a monitoring occasion associated with the CSS.

In some implementations, a method of wireless communication performed by a UE includes receiving, from a base station, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and receiving, from the base station and based at least in part on the indication, the first type of PDCCH or the second type of PDCCH at a monitoring occasion associated with the CSS.

In some implementations, a method of wireless communication performed by a base station includes transmitting, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and transmitting, to the UE and based at least in part on the indication, the first type of PDCCH or the second type of PDCCH at a monitoring occasion associated with the CSS.

In some implementations, a non-transitory computer-readable medium storing a set of instructions for wireless communication includes one or more instructions that, when executed by one or more processors of a UE, cause the UE to: receive, from a base station, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and receive, from the base station and based at least in part on the indication, the first type of PDCCH or the second type of PDCCH at a monitoring occasion associated with the CSS.

In some implementations, a non-transitory computer-readable medium storing a set of instructions for wireless communication includes one or more instructions that, when executed by one or more processors of a base station, cause the base station to: transmit, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and transmit, to the UE and based at least in part on the indication, the first type of PDCCH or the second type of PDCCH at a monitoring occasion associated with the CSS.

In some implementations, an apparatus for wireless communication includes means for receiving, from a base station, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and means for receiving, from the base station and based at least in part on the indication, the first type of PDCCH or the second type of PDCCH at a monitoring occasion associated with the CSS.

In some implementations, an apparatus for wireless communication includes means for transmitting, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and means for transmitting, to the UE and based at least in part on the indication, the first type of PDCCH or the second type of PDCCH at a monitoring occasion associated with the CSS.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
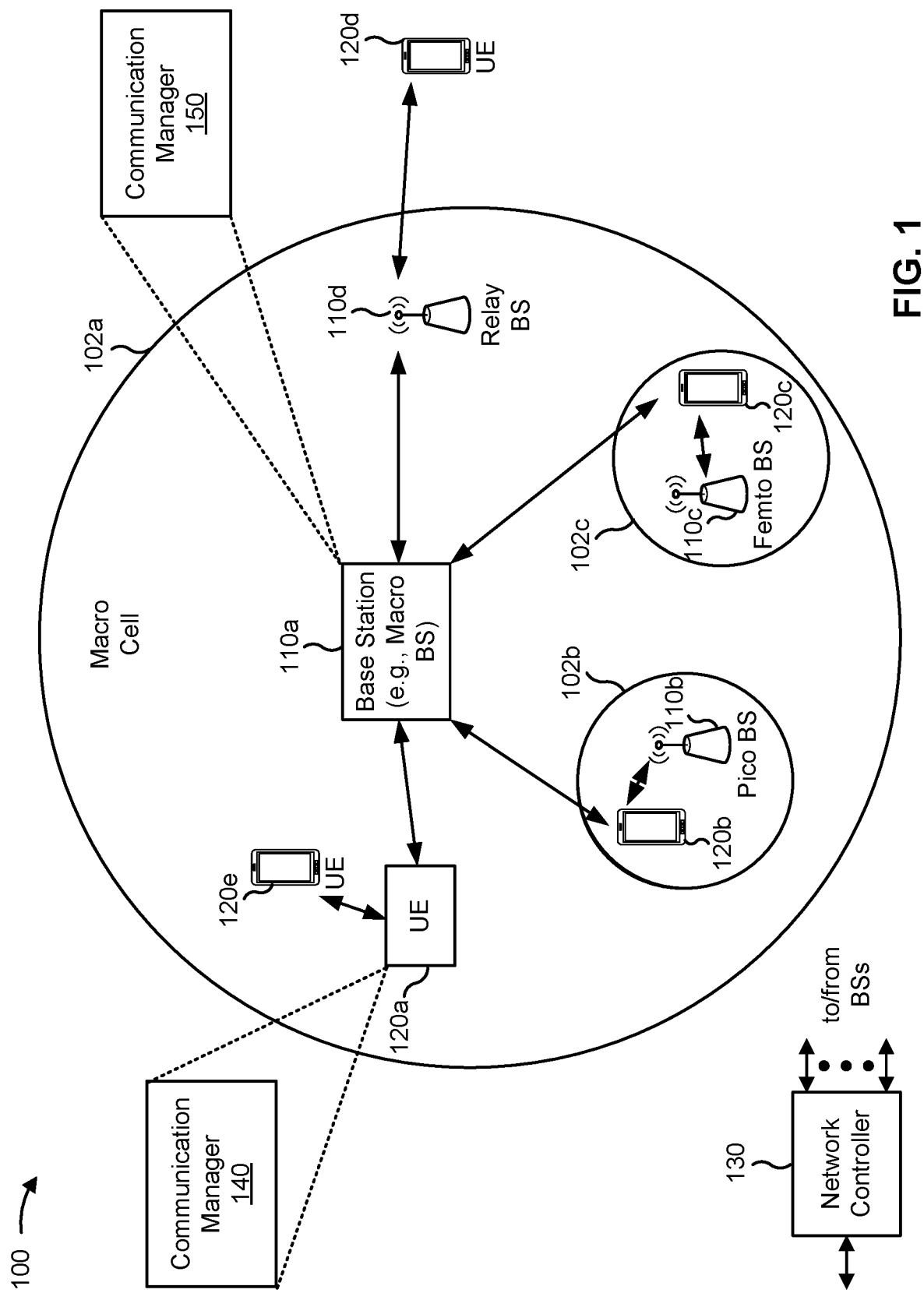
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a base station, an indication that indicates whether a common search space (CSS) is associated with a first type of physical downlink control channel (PDCCH) or a second type of PDCCH, wherein the first type of PDCCH corresponds to a cell-broadcast PDCCH and the second type of PDCCH corresponds to a UE-specific PDCCH, and wherein the CSS is for downlink control information (DCI) with a cyclic redundancy check (CRC) scrambled by a group radio network temporary identifier (G-RNTI) that schedules a multicast and broadcast service (MBS); and receive, from the base station and based at least in part on the indication, the first type of PDCCH or the second type of PDCCH at a monitoring occasion associated with the CSS. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and transmit, to the UE and based at least in part on the indication, the first type of PDCCH or the second type of PDCCH at a monitoring occasion associated with the CSS. Additionally, or alternatively, the communication manager 150 may perform one or more other operations described herein.

As indicated above, FIG. 1 is provided as an example. Other examples may differ from what is described with regard to FIG. 1.

Figure 2:
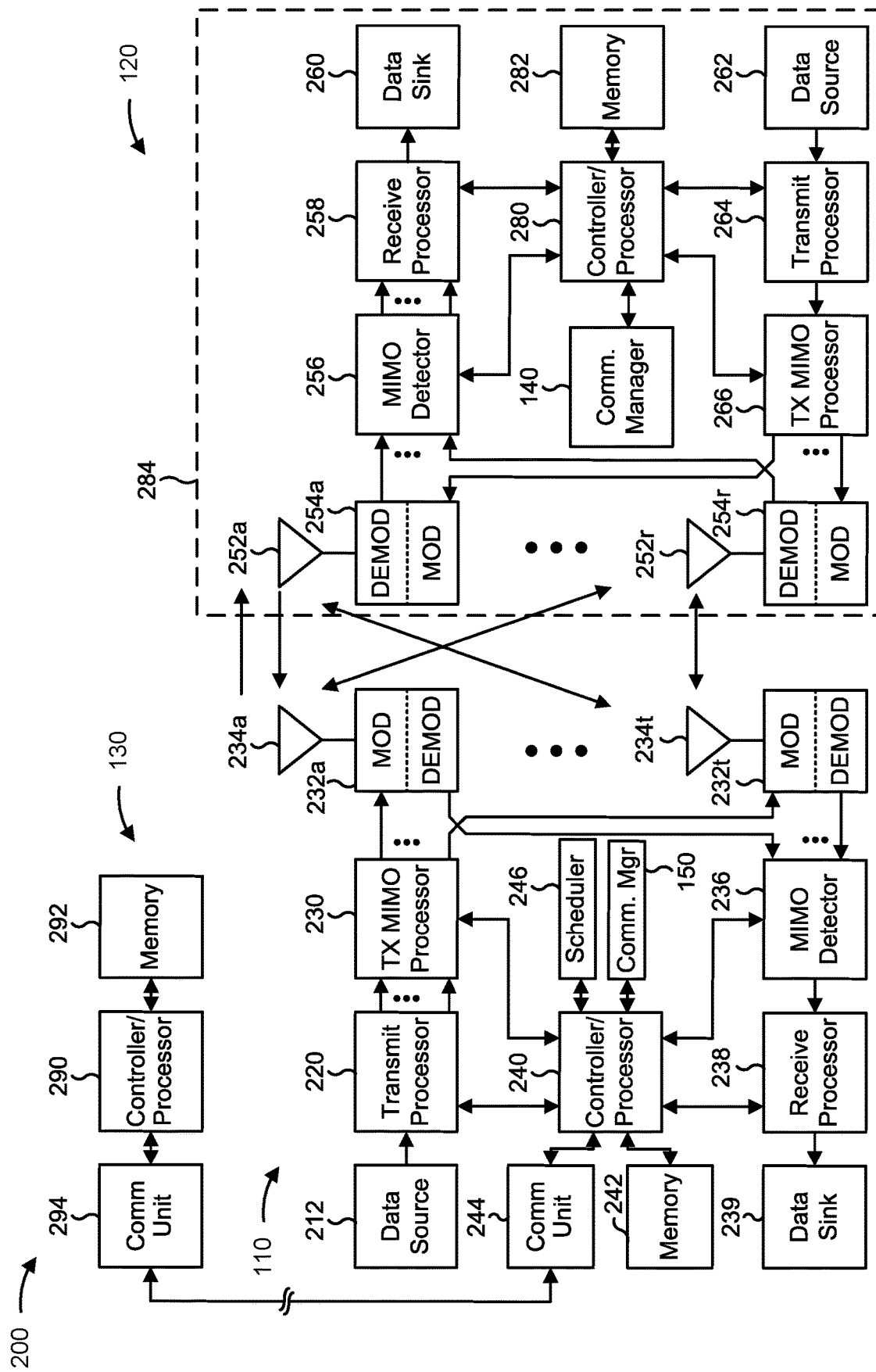
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-12).

The controller/processor 240 of the base station 110, the controller/processor 280 of the UE 120, and/or any other component(s) of FIG. 2 may perform one or more techniques associated with receiving PDCCHs for MBSs at monitoring occasions, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a base station, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and/or means for receiving, from the base station and based at least in part on the indication, the first type of PDCCH or the second type of PDCCH at a monitoring occasion associated with the CSS. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for transmitting, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for DCI with a CRC scrambled by a G-RNTI that schedules an MBS; and/or means for transmitting, to the UE and based at least in part on the indication, the first type of PDCCH or the second type of PDCCH at a monitoring occasion associated with the CSS. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

With regard to multicast group scheduling for radio resource control (RRC) connected UEs, a common frequency resource (CFR) may be used for a multicast group common physical downlink control channel (GP-PDCCH) and/or a group common physical downlink shared channel (GP-PDSCH). The CFR for GP-PDCCH and/or GP-PDSCH (GC-PDCCH/PDSCH) may be configured within a frequency resource of a dedicated unicast bandwidth part (BWP) and may use a same numerology (e.g., a same subcarrier spacing (SCS) and cyclic prefix (CP)). A GC-PDCCH with a CRC scrambled by a common radio network temporary identifier (RNTI) may be used to schedule a GC-PDSCH scrambled by the same common RNTI.

A CFR configuration may indicate a starting physical resource block (PRB) and a quantity of PRBs. The CFR configuration may indicate a PDSCH configuration (PDSCH-config) for an MBS, which may be separate from a PDSCH configuration of the dedicated unicast BWP. The CFR configuration may indicate a PDCCH configuration (PDCCH-config) for a multicast and broadcast service (MBS), which may be separate from a PDCCH configuration of the dedicated unicast BWP. The CFR configuration may indicate a semi-persistent scheduling (SPS) configuration (SPS-config) for the MBS, which may be separate from an SPS configuration of the dedicated unicast BWP.

A CFR may be supported per (i.e., for each) dedicated unicast BWP for multicast of RRC connected UEs. In some cases, more than one CFR may be supported per dedicated unicast BWP. In some cases, multicast may be supported or not supported in a dedicated unicast BWP when no CFR is configured for that BWP. The CFR may be defined as an MBS frequency region, where the CFR may be associated with a UE dedicated BWP other than an initial BWP, and the CFR may be supported at least for multicast connected UEs.

Figure 3:
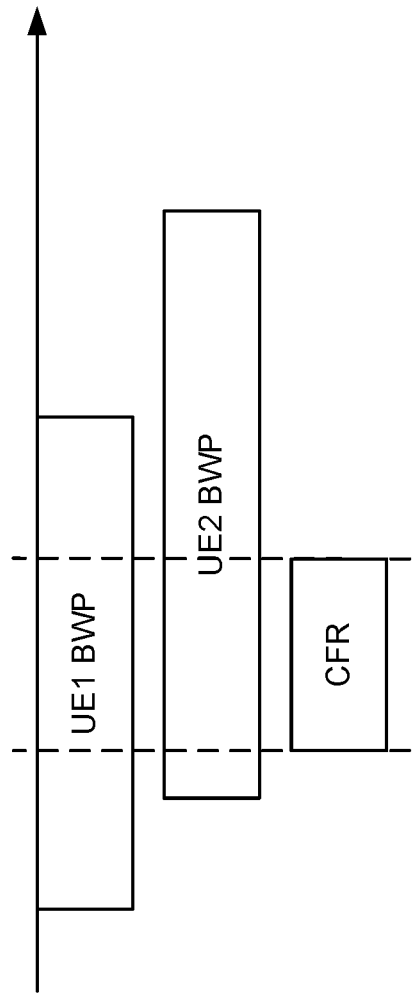
FIG. 3 is a diagram illustrating an example of a common frequency resource (CFR), in accordance with the present disclosure.

FIG. 3 is a diagram illustrating an example 300 of a CFR, in accordance with the present disclosure.

As shown in FIG. 3, a first BWP may be associated with a first UE (UE1 BWP), and a second BWP may be associated with a second UE (UE2 BWP). The first BWP may not be aligned with the second BWP. A CFR may be associated with a frequency range within the first BWP and within the second BWP. In other words, the CFR may be common to both the first BWP associated with the first UE and the second BWP associated with the second UE.

As indicated above, FIG. 3 is provided as an example. Other examples may differ from what is described with regard to FIG. 3.

A control resource set (CORESET) for a GC-PDCCH may be configured within a CFR. For example, a frequency domain CORESET resource may be within the CFR, or a CORESET configuration may be provided as part of a CFR configuration in RRC signaling. A maximum quantity of CORESETs allowed per BWP may not be increased to support MBS, and a quantity of CORESETs configured within the CFR may depend on a base station implementation.

With respect to CORESET sharing between multicast and unicast, a CORESET configured in the PDCCH configuration for the MBS in the CFR may be used for unicast transmission. A CORESET configured in the PDCCH configuration for the MBS in the CFR, and for unicast in a dedicated unicast BWP, may be used for multicast transmission when the CORESET is fully contained in the CFR in a frequency domain. In some cases, the CORESET may or may not be configured in the CFR.

A common search space (CSS) may be used to carry a DCI format of a GC-PDCCH, where control channel element (CCE) indexes may be common for UEs in a multicast group. In some cases, a CSS that is used to carry the DCI format of the GC-PDCCH may be a Type-3 CSS. A monitoring priority of the Type-3 CSS may be defined for the GC-PDCCH. In some cases, a Type-x CSS may be supported. A monitoring priority of the Type-x CSS may be determined based at least in part on synchronization signal (SS) set indexes of the Type-x CSS set and UE-specific search space (USS) sets, regardless of which downlink control information (DCI) format of the GC-PDCCH is configured in the Type-x CSS. In some cases, the Type-x CSS may be the Type-3 CSS.

For the MBS, a maximum quantity of monitored PDCCH candidates and non-overlapped CCEs may be defined per slot per serving cell, or the maximum quantity of monitored PDCCH candidates and non-overlapping CCEs may be defined per span per serving cell, where a span may be one or multiple consecutive OFDM symbols in a slot. A budget of blind decodings (BDs) and/or CCEs of a component carrier (CC) may be used, similar to a multi-DCI based multi-TRP. For the MBS, a "3+1" DCI size budget may be defined. To limit UE complexity, the "3+1" DCI size budget may refer to the UE monitoring at most three different DCI sizes using a cell RNTI (C-RNTI) (hence being time-critical for scheduling) and one DCI size using other RNTIs (and hence less time critical). A group RNTI (G-RNTI) may be counted as a C-RNTI or as another type of RNTI.

For the MBS, two DCI formats may be supported for the GC-PDCCH. A DCI format 1_0 may be used as a baseline for a first DCI format with a CRC scrambled with a G-RNTI. As a baseline, existing fields in the DCI format 1_0 may be reused with the CRC scrambled by a C-RNTI for fields of the first DCI format. DCI format 1_1 or 1_2 may be used as a baseline for a second DCI format with a CRC scrambled with a G-RNTI. As a baseline, existing fields in the DCI format 1_1 may be reused for fields of the second DCI format.

For broadcast, the CFR may be defined for the GC-PDCCH/PDSCH. The UE may assume an initial BWP as a default CFR for the GC-PDCCH/PDSCH, when a specific CFR is not configured. A relationship between the CFR (if configured) and the initial BWP may be defined. In some cases, one or more CFRs may be configured for idle/inactive UEs. The UE may use a configured/defined CFR with a same size as the initial BWP, where the initial BWP may have same frequency resources as a CORESET, to receive the GC-PDCCH/PDSCH carrying a multicast control channel (MCCH) or a multicast traffic channel (MTCH).

For RRC idle or inactive UEs, up to two CORESETs may be configured within the CFR. A first CORESET (CORESET #0) may be used by default when the CFR is the initial BWP and the CORESET is not configured. When the CFR has a same frequency range as the initial BWP (e.g., the CORESET or a system information block type 1 (SIB1) configured initial BWP), UEs may be configured with the first CORESET (CORESET #0), and/or a CORESET configured by a common control resource set (commonControlResourceSet) parameter.

For RRC idle/inactive UEs, the CSS may be supported for the GC-PDCCH. The CSS may be the Type-3 CSS or the Type-x CSS. For the MCCH, both a first search space (searchSpace #0) and a CSS other than the first search space (searchSpace #0) can be configured. A same CSS type may be supported for the MCCH and the MTCH, or different CSS types may be supported for the MCCH and the MTCH. For RRC idle/inactive UEs, DCI format 1_0 may be used as a baseline for the GC-PDCCH of the MCCH and the MTCH.

For RRC idle/inactive UEs, for broadcast, beam sweeping may be supported for the GC-PDCCH/PDSCH. The UE may assume that the GC-PDCCH/PDSCH is quasi co-located with a synchronization signal block (SSB), and may be quasi co-located with a tracking reference signal (TRS) if configured. Depending on a UE implementation, the UE may monitor monitoring occasions corresponding to all SSB indexes or monitoring occasions corresponding to a subset of all SSB indexes. A same beam may be used for the GC-PDCCH and a corresponding scheduled GC-PDSCH for carrying the MCCH or the MTCH. The UE may assume that DMRS ports of the GC-PDCCH/PDSCH for the MCCH or the MTCH are quasi co-located with the SSB.

When the first search space (searchSpace #0) is configured for the MCCH, a mapping between PDCCH occasions and SSBs may be the same as for the SIB1. When a CSS other than the first search space (searchSpace #0) is configured for the MCCH, PDCCH monitoring occasions for an MCCH message which are not overlapping with uplink symbols may be sequentially numbered in an MCCH transmission window and may be mapped to SSBs.

For an MCCH change notification due to a session start, in a first option, a dedicated RNTI may be defined to scramble a CRC of a DCI indicating the MCCH change notification. In a second option, a field in a DCI format scheduling a MCCH may be used without a dedicated RNTI for the MCCH change notification.

System information may deliver at least one G-RNTI and a configuration for MBS reception in idle/inactive states, which may allow for receipt of the MCCH. An MBS based at least in part on the configuration provided by the system information (e.g., MCCH) may also include delivery of additional G-RNTI(s) and configurations for MBS reception. A common medium access control control element (MAC-CE) carried by a PDSCH may also provide configuration information. The MBS received in a cell-common CFR based at least in part on a broadcast RRC message may be referred to as "the broadcast of the MBS." Features for receiving the broadcast of the MBS may be similar to those for receiving SIBs/paging messages. A DCI format for the broadcast of the MBS may be DCI format 1_0, and hybrid automatic repeat request acknowledgement (HARQ-ACK) may not be supported for the broadcast of the MBS.

Figure 4:
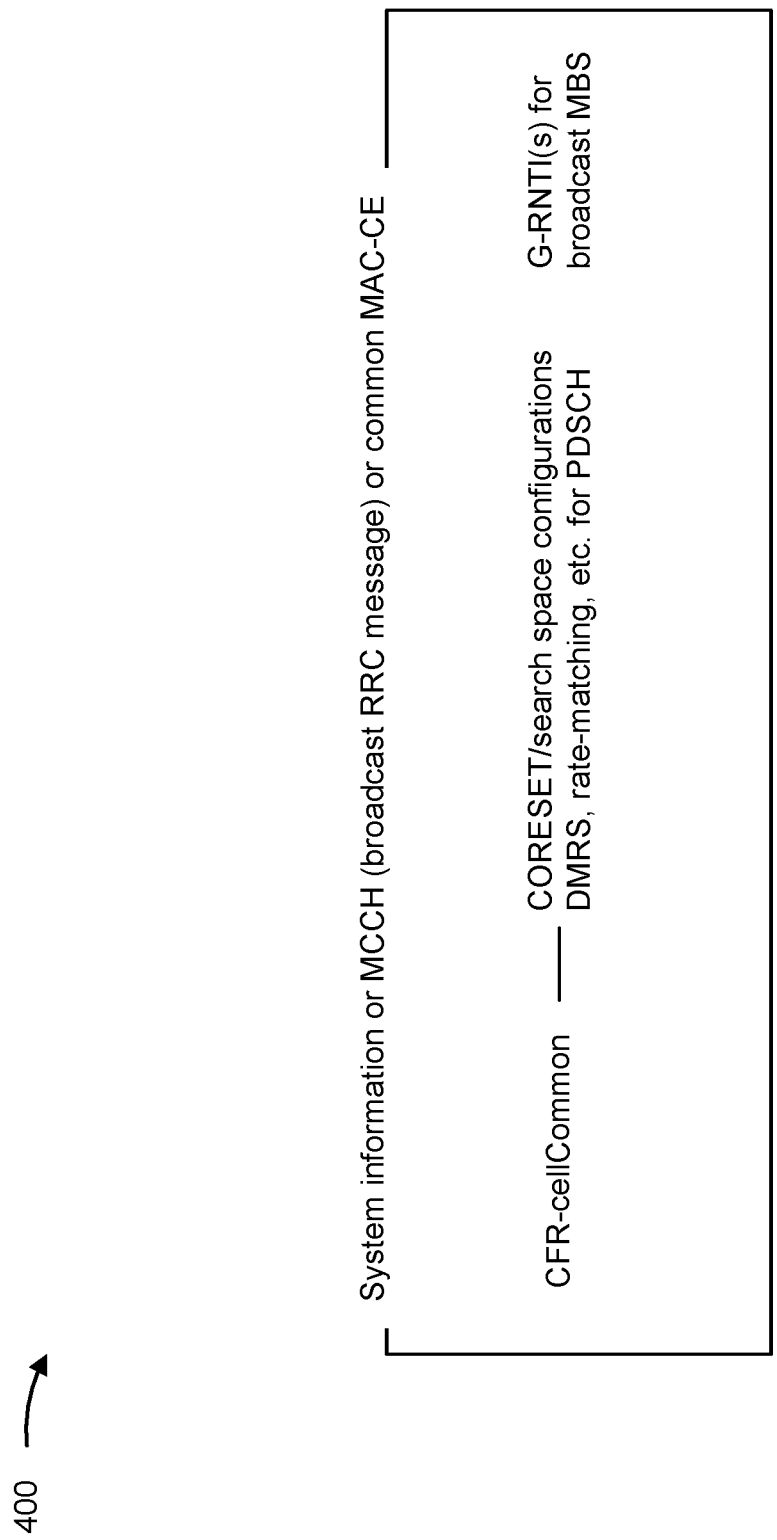
FIG. 4 is a diagram illustrating an example of a multicast and broadcast service (MBS) configuration for a radio resource control (RRC) idle/inactive state, in accordance with the present disclosure.

FIG. 4 is a diagram illustrating an example 400 of a multicast and broadcast service (MBS) configuration for a radio resource control (RRC) idle/inactive state, in accordance with the present disclosure.

As shown in FIG. 4, a base station may transmit, to a UE, system information or an MCCH (e.g., a broadcast RRC message), or a common MAC-CE may indicate a cell-common CFR (e.g., CFR-cellCommon) parameter. The CFR-cellCommon parameter may indicate a CORESET, search space configurations, DMRS, and/or rate-matching for a PDSCH. Further, the system information or the MCCH (e.g., the broadcast RRC message) or the common MAC-CE may indicate G-RNTI(s) for broadcast MBS.

As indicated above, FIG. 4 is provided as an example. Other examples may differ from what is described with regard to FIG. 4.

During an RRC connected state, a UE may be configured with a CFR that includes a PDCCH configuration (PDCCH-Config) and a PDSCH configuration (PDSCH-Config) in a downlink BWP configuration. An MBS received in the CFR in the downlink BWP configuration based on a dedicated RRC message may be referred to as "the multicast of the MBS." Features for receiving the multicast of the MBS may be different than those for receiving SIBS/paging messages. A DCI format for the multicast of the MBS may be either DCI format 1_0 or DCI format 1_1, and HARQ-ACK may be supported for the multicast of the MBS FIG. 5 is a diagram illustrating an example 500 of an MBS configuration for an RRC connected state, in accordance with the present disclosure.

Figure 5:
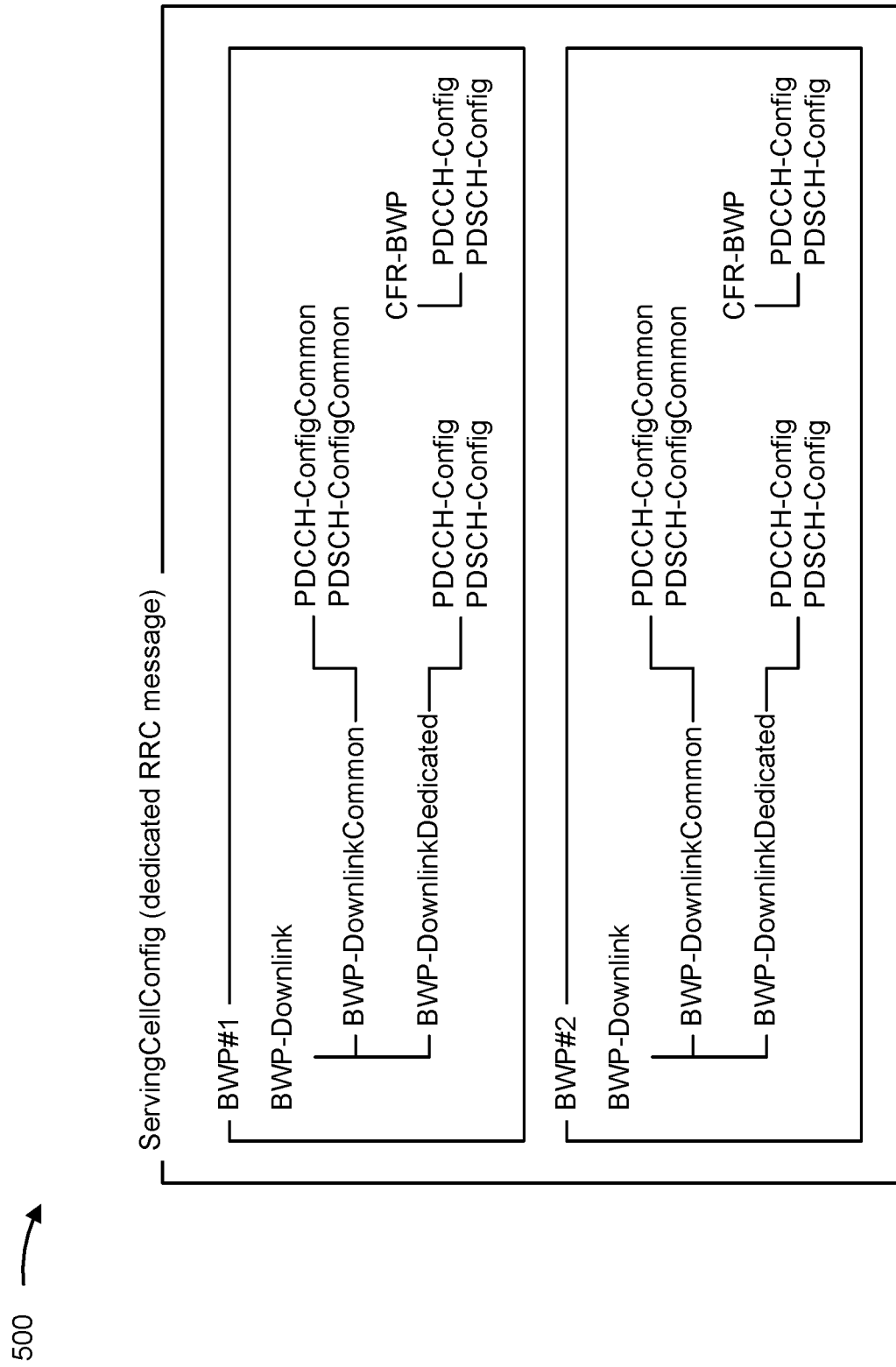
FIGS. 5-7 are diagrams illustrating examples of MBS configurations for RRC connected states, in accordance with the present disclosure.

As shown in FIG. 5, a base station may transmit, to a UE, a serving cell configuration (ServingCellConfig), which may be a dedicated RRC message. The ServingCellConfig parameter may indicate, for a BWP configuration, a BWP downlink (BWP-Downlink) parameter. The BWP-Downlink may be associated with a BWP downlink common (BWP-DownlinkCommon) parameter and a BWP downlink dedicated (BWP-DownlinkDedicated) parameter. The BWP-DownlinkCommon parameter may be associated with a PDCCH configuration common (PDCCH-ConfigCommon) parameter and a PDSCH configuration common (PDSCH-ConfigCommon) parameter. The BWP-DownlinkDedicated parameter may be associated with a PDCCH configuration (PDCCH-Config) parameter and a PDSCH configuration (PDSCH-Config) parameter. Further, the BWP configuration may indicate a CFR BWP (CFR-BWP) parameter, which may be associated with a PDCCH-Config parameter and a PDSCH-Config parameter.

As indicated above, FIG. 5 is provided as an example. Other examples may differ from what is described with regard to FIG. 5.

Figure 6:
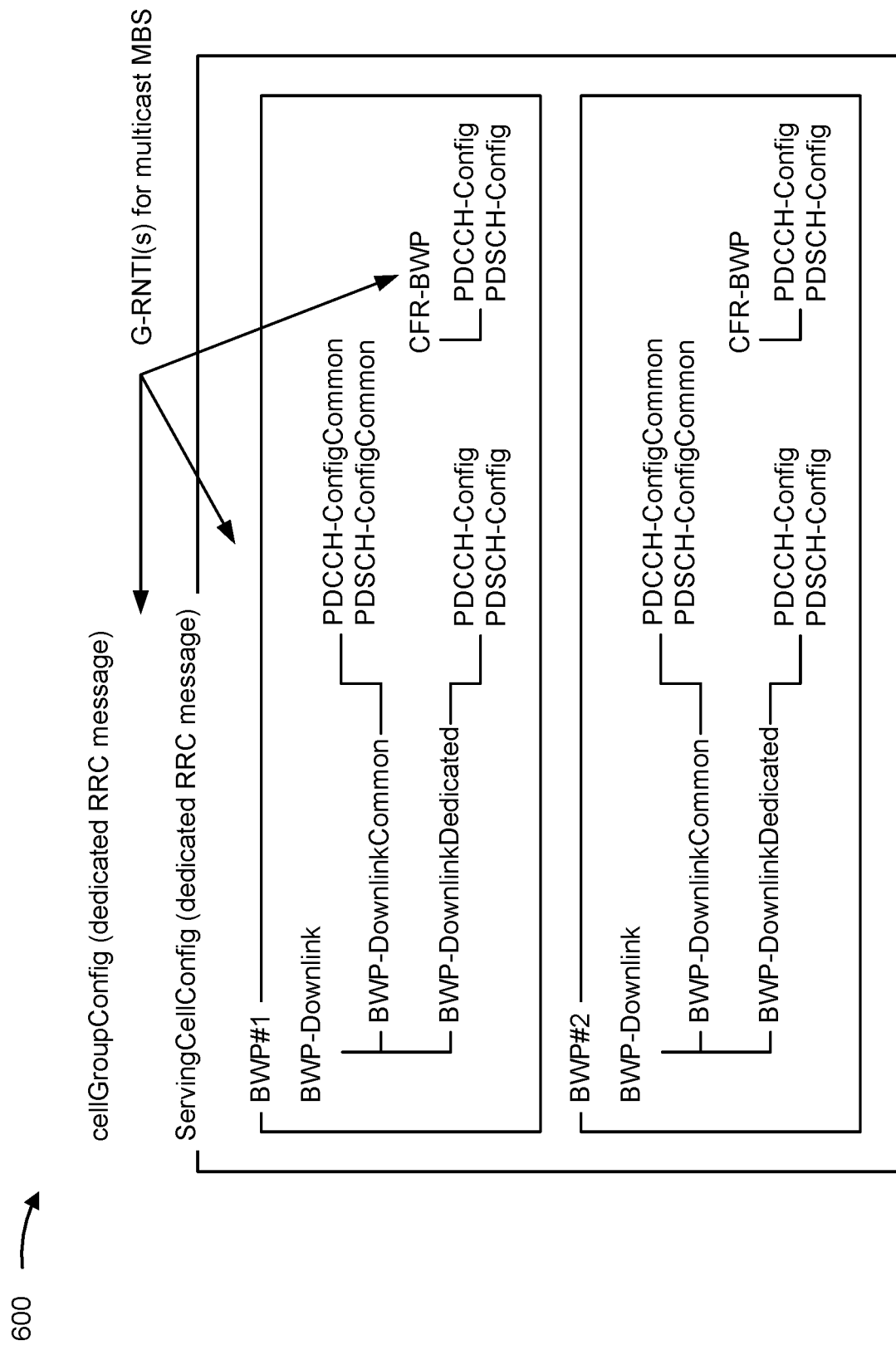

FIG. 6 is a diagram illustrating an example 600 of an MBS configuration for an RRC connected state, in accordance with the present disclosure.

As shown in FIG. 6, during an RRC connected state, G-RNTI(s) for multicast MBS may be provided by a dedicated RRC message. In a first option, G-RNTI(s) for multicast MBS may be configured in a BWP configuration. Different sets of G-RNTI(s) may be configured for different downlink BWPs. The BWP configuration may indicate a CFR-BWP parameter. In a second option, G-RNTI(s) for multicast MBS may be configured in a ServingCellConfig, which may be associated with a dedicated RRC message. G-RNTI(s) may be common for different downlink BWPs, but may be independent for different serving cells. In a third option, G-RNTI(s) for multicast MBS may be configured in a cell-group configuration (cellGroupConfig), which may be associated with a dedicated message.

As indicated above, FIG. 6 is provided as an example. Other examples may differ from what is described with regard to FIG. 6.

In an RRC connected state, a UE may receive a broadcast of an MBS in an active downlink BWP. A CFR for the broadcast of the MBS may be identified by a broadcast RRC message or a common MAC-CE. Alternatively, a base station may indicate, to the UE, the CFR for the broadcast of the MBS as a dedicated RRC message. In the RRC connected state, in a first case, a multicast of an MBS may be received in an active downlink BWP. In a second case, the broadcast of the MBS may be received in the active downlink BWP. In a third case, multicast and broadcast of the MBS may be received in the active downlink BWP.

Figure 7:
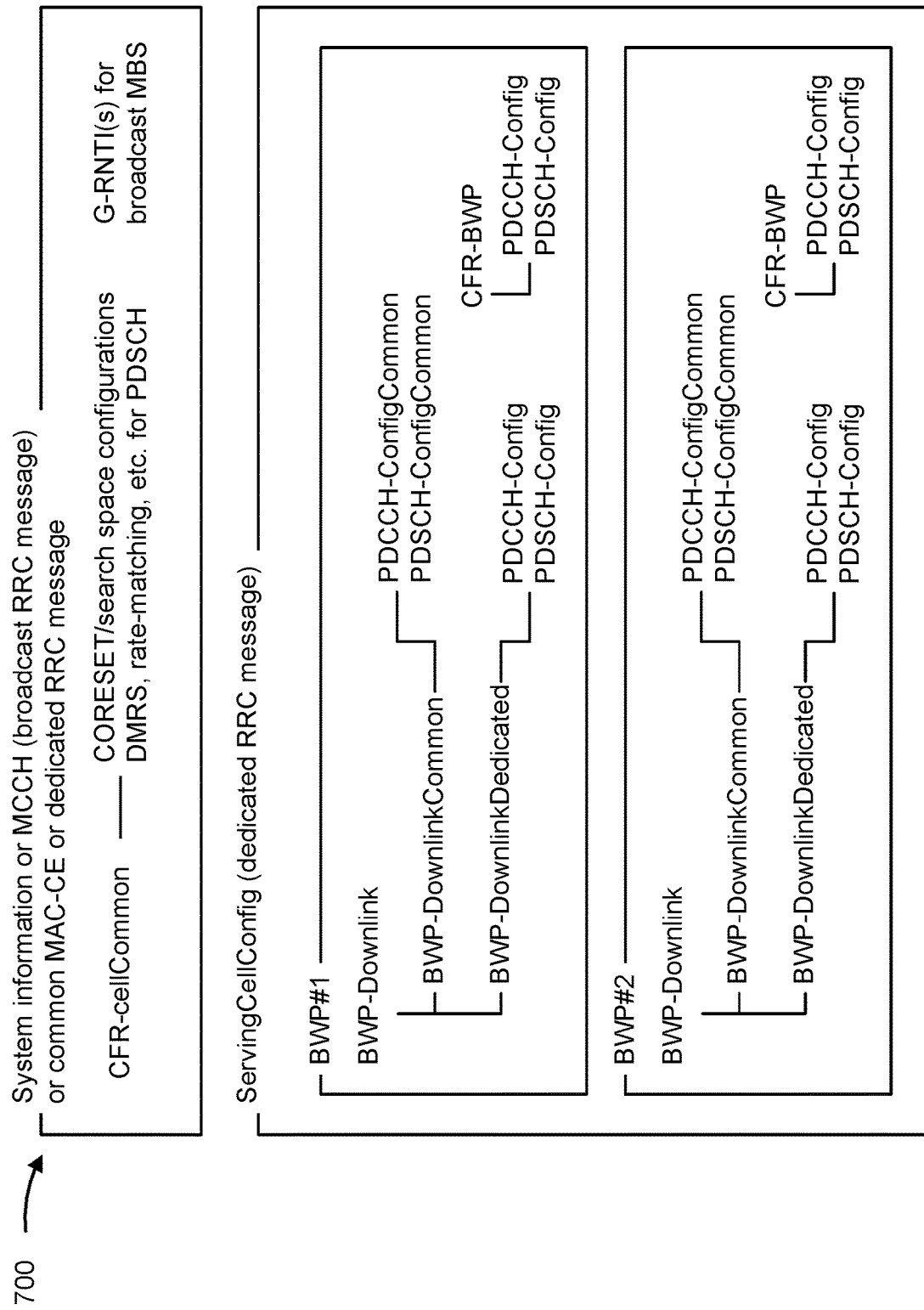

FIG. 7 is a diagram illustrating an example 700 of an MBS configuration for an RRC connected state, in accordance with the present disclosure.

As shown in FIG. 7, in an RRC connected state, a UE may receive system information, an MCCH (e.g., a broadcast RRC message), a common MAC-CE, or a dedicated RRC message, which may indicate a CFR-cellCommon parameter, which may be associated with a broadcast of an MBS. Alternatively, a UE may receive a ServingCellConfig (e.g., a dedicated RRC message), which may be associated with the broadcast of the MBS. In either case, the UE may receive the broadcast of the MBS in an active downlink BWP.

As indicated above, FIG. 7 is provided as an example. Other examples may differ from what is described with regard to FIG. 7.

For a Type 1 CSS with a dedicated RRC configuration, a Type 3 CSS, and a UE search space (UE-SS) (e.g., a UE-specific PDCCH that schedules unicast PDSCH/PUSCH), a PDCCH monitoring occasion may be within a first three OFDM symbols of a slot. For a Type 1 CSS without a dedicated RRC configuration and for a Type 0, Type 0A, and Type 2 CSS (e.g., a cell-broadcast PDCCH that does not schedule unicast PDSCH/PUSCH), a PDCCH monitoring occasion may be within any OFDM symbol(s) of the slot. PDCCH monitoring occasions for any of Type 1 CSS without the dedicated RRC configuration, or Types 0, 0A, or 2 CSS configurations may be within a single span of three consecutive OFDM symbols within the slot.

Cell-broadcast PDCCH may occur in any OFDM symbol of the slot to accommodate a dynamic spectrum sharing (DSS) scenario (e.g., an LTE cell-specific reference signal (CRS) in a first 1-2 OFDM symbols and an LTE-PDCCH in a first 1-3 OFDM symbols). Further, a UE support may not depend on DSS. In other words, regardless of a presence of a DSS carrier, the cell-broadcast PDCCH may occur in any OFDM symbol of the slot.

Figure 8:
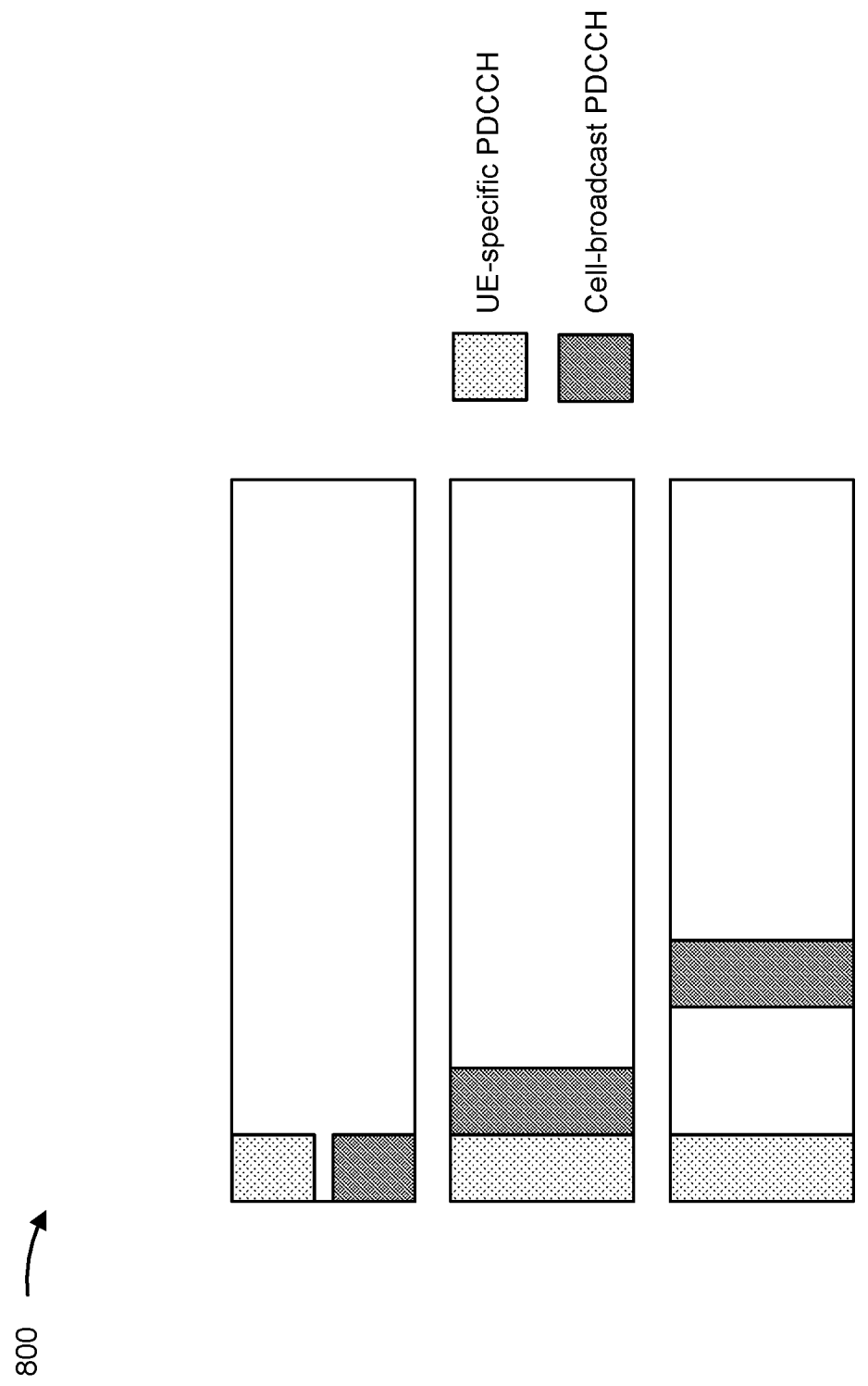
FIG. 8 is a diagram illustrating an example of physical downlink control channel (PDCCH) monitoring occasions, in accordance with the present disclosure.

FIG. 8 is a diagram illustrating an example 800 of PDCCH monitoring occasions, in accordance with the present disclosure.

As shown in FIG. 8, for a UE-specific PDCCH, PDCCH monitoring occasions may be within a first three OFDM symbols of a slot. For a cell-broadcast PDCCH, PDCCH monitoring occasions may be at any OFDM symbol(s) of the slot. Thus, the cell-broadcast PDCCH may be received at a beginning of the slot, similar to the UE-specific PDCCH, or alternatively, the cell-broadcast PDCCH may be received later in the slot as compared to the UE-specific PDCCH.

As indicated above, FIG. 8 is provided as an example. Other examples may differ from what is described with regard to FIG. 8.

A search space for a GC-PDCCH for an MBS may be defined as a Type-x CSS. However, a UE may not be configured with respect to which case is associated with the Type-x CSS. In other words, the UE may not be configured as to whether the Type-x CSS is associated with the UE-specific PDCCH or whether the Type-x CSS is associated with the cell-broadcast PDCCH. A PDCCH in the Type-x CSS, with CRC scrambled by a G-RNTI, may schedule a group-common and/or an MBS PDSCH for a group of UEs.

In various aspects of techniques and apparatuses described herein, a UE may receive, from a base station, an indication that indicates whether a CSS (e.g., Type-x CSS) is associated with a first type of PDCCH or a second type of PDCCH. The first type of PDCCH may correspond to a cell-broadcast PDCCH and the second type of PDCCH may correspond to a UE-specific PDCCH. The CSS may be for DCI with a CRC scrambled by a G-RNTI that schedules an MBS. The UE may receive, from the base station and based at least in part on the indication, the first type of PDCCH or the second type of PDCCH at a monitoring occasion associated with the CSS. In some aspects, the indication may indicate that the CSS is associated with the cell-broadcast PDCCH, where the monitoring occasion associated with the CSS may be one or more symbols of a slot within a single span of three consecutive symbols within the slot. In some aspects, the indication may indicate that the CSS is associated with the UE-specific PDCCH, where the monitoring occasion associated with the CSS may be within a first three symbols of a slot. In some aspects, the indication may indicate that the CSS is a first type of CSS associated with the cell-broadcast PDCCH or that the CSS is a second type of CSS associated with the UE-specific PDCCH. Based at least in part on the indication, the UE may determine whether the CSS is associated with the cell-broadcast PDCCH or the UE-specific PDCCH.

Figure 9:
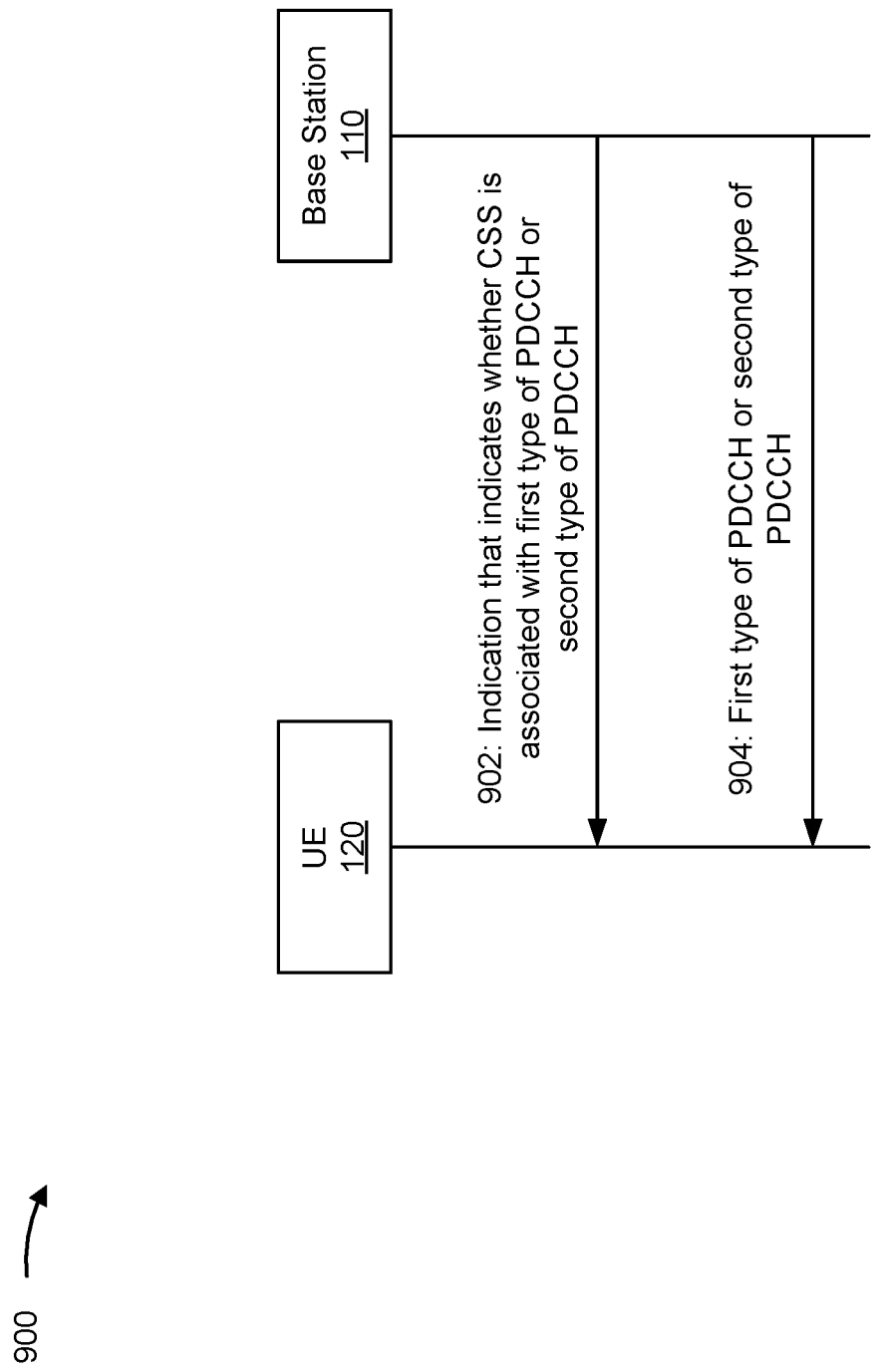
FIG. 9 is a diagram illustrating an example associated with receiving PDCCHs for MBSs at monitoring occasions, in accordance with the present disclosure.

FIG. 9 is a diagram illustrating an example associated with receiving PDCCHs for MBSs at monitoring occasions, in accordance with the present disclosure. As shown in FIG. 9, example 900 includes communication between a UE (e.g., UE 120) and a base station (e.g., base station 110). In some aspects, the UE and the base station may be included in a wireless network, such as wireless network 100.

As shown by reference number 902, the UE may receive, from the base station, an indication that indicates whether a CSS is associated with a first type of PDCCH or a second type of PDCCH. The first type of PDCCH may correspond to a cell-broadcast PDCCH and the second type of PDCCH may correspond to a UE-specific PDCCH. The CSS may be for DCI with a CRC scrambled by a G-RNTI that schedules an MBS.

In some aspects, the indication may indicate that the CSS is associated with the cell-broadcast PDCCH, where a monitoring occasion associated with the CSS may be one or more OFDM symbols of a slot within a single span of three consecutive OFDM symbols within the slot. In some aspects, the CSS such as a Type-x CSS may be associated with the cell-broadcast PDCCH. The monitoring occasion (e.g., a PDCCH monitoring occasion) may be any OFDM symbol(s) of the slot within the single span of the three consecutive OFDM symbols within the slot, where the single span may be a common span with a Type 1 CSS without a dedicated RRC configuration and for Type 0, Type 0A, and Type 2 CSS.

In this case, separated occasions may be allowed for a UE-specific PDCCH and the Type-x CSS. A UE in an RRC connected state may need to monitor a PDCCH scheduling a unicast PDSCH/PUSCH and a GC-PDSCH in different spans within a same slot. Unlike the cell-broadcast PDCCH, a GC-PDCCH in the Type-x CSS may schedule a multicast of an MBS, which may be UE-specifically configured by a dedicated RRC message and may require the UE to feedback an ACK or NACK within a certain timeline requirement.

In some aspects, the CSS and the UE-specific PDCCH may be configured to not be monitored within the slot. In some aspects, the CSS and the UE-specific PDCCH may be configured to be monitored within the slot in different spans of the slot, or the UE may not monitor either the CSS or the UE-specific PDCCH. In some aspects, the UE may not expect to be configured such that the Type-x CSS and the UE-specific PDCCH are monitored within the same slot. In some aspects, the UE may be configured such that the Type-x CSS and the UE-specific PDCCH are monitored within the same slot in different spans, but in this case, the UE may not be required to monitor either of the different spans within the same slot. For example, the UE may not be required to monitor the Type-x CSS in a slot, and/or the UE may not be required to monitor the UE-specific PDCCH in the slot.

In some aspects, the indication may indicate that the CSS is associated with the UE-specific PDCCH, where the monitoring occasion associated with the CSS may be within a first three OFDM symbols of a slot. In some aspects, the Type-x CSS may be associated with the UE-specific PDCCH. The PDCCH monitoring occasion may be within the first three OFDM symbols of the slot, where the first three OFDM symbols may be a common span as for a Type 1 CSS with a dedicated RRC configuration, Type 3 CSS, and UE-SS.

In this case, separated occasions may be allowed for the cell-broadcast PDCCH and the Type-x CSS. A UE in an RRC idle/inactive state may need to monitor the cell-broadcast PDCCH and the GC-PDCCH that schedules the GC-PDSCH in different spans within the same slot. Typically, a UE in an RRC idle/inactive state is not required to monitor a PDCCH more than once per slot.

In some aspects, the CSS and the cell-broadcast PDCCH may be configured to not be monitored within a slot. In some aspects, the CSS and the cell-broadcast PDCCH for MBS may be configured to be monitored within a slot in different spans of the slot, or the UE may not monitor either the CSS or the cell-broadcast PDCCH for MBS. In some aspects, the UE may not expect to be configured such that the Type-x CSS and the cell-broadcast PDCCH are monitored within the same slot. In some aspects, the UE may be configured such that the Type-x CSS and the cell-broadcast PDCCH are monitored within the same slot in different spans, but in this case, the UE may not be required to monitor either of the different spans within the same slot. For example, the UE may not be required to monitor the Type-x CSS in the slot, and/or the UE may not be required to monitor the cell-broadcast PDCCH in the slot.

In some aspects, the indication may indicate that the CSS is a first type of CSS associated with the cell-broadcast PDCCH or that the CSS is a second type of CSS associated with the UE-specific PDCCH. The first type of CSS may be associated with delivering a GC-PDCCH for a broadcast of the MBS and the second type of CSS may be associated with delivering a GC-PDCCH for a multicast of the MBS. The broadcast of the MBS may not be associated with HARQ-ACK feedback or may be received in an idle or inactive state. The multicast of the MBS may be associated with the HARQ-ACK feedback and may be received in a connected state.

In some aspects, the Type-x CSS may be divided into a first type of Type-x CSS and a second type of Type-x CSS, where the first type of Type-x CSS may be associated with the cell-broadcast PDCCH and the second type of Type-x CSS may be associated with the UE-specific PDCCH. The first type of Type-x CSS may be used to deliver the GC-PDCCH for the broadcast of the MBS, and the second type of Type-x CSS may be used to deliver the GC-PDCCH for the multicast of the MBS.

In some aspects, in the RRC idle/inactive state, the UE may monitor the GC-PDCCH for the broadcast of the MBS but not for the multicast of the MBS, as no more than one PDCCH monitoring occasion may exist in the slot. In some aspects, in the RRC connected state, the UE may monitor up to two PDCCH monitoring occasions within the slot. However, the GC-PDCCH for the multicast of the MBS and a unicast PDCCH may be within a same span or PDCCH monitoring occasion, thereby not increasing complexity for the UE.

In some aspects, the indication may indicate that the CSS is associated with the cell-broadcast PDCCH and that a UE-specific search space (USS) is associated with the UE-specific PDCCH. In some aspects, the USS for a group of UEs may be supported, in addition to a Type-x CSS for the GC-PDCCH for the MBS. In this case, the Type-x CSS may be associated with the cell-broadcast PDCCH, and the USS for the group of UEs may be associated with the UE-specific PDCCH.

As shown by reference number 904, the UE may receive, from the base station and based at least in part on the indication, the first type of PDCCH or the second type of PDCCH at a monitoring occasion associated with the CSS. The first type of PDCCH may correspond to the cell-broadcast PDCCH and the second type of PDCCH may correspond to the UE-specific PDCCH.

As indicated above, FIG. 9 is provided as an example. Other examples may differ from what is described with regard to FIG. 9.

In legacy carrier aggregation, a PDCCH may be monitored within a first three OFDM symbols. MBS on a secondary cell (SCell) may require a UE to monitor a GC-PDCCH on the SCell. For the MBS on the SCell, a Type-x CSS may be associated with a cell-broadcast PDCCH, the Type-x CSS may be associated with a UE-specific PDCCH, and/or the Type-x CSS may be split into two sub-types where a first sub-type is associated with the cell-broadcast PDCCH and the second sub-type is associated with the UE-specific PDCCH. The GC-PDCCH for the broadcast of the MBS may not be monitored within the first three OFDM symbols, which may avoid transmitting a duplicated GC-PDCCH.

Figure 10:
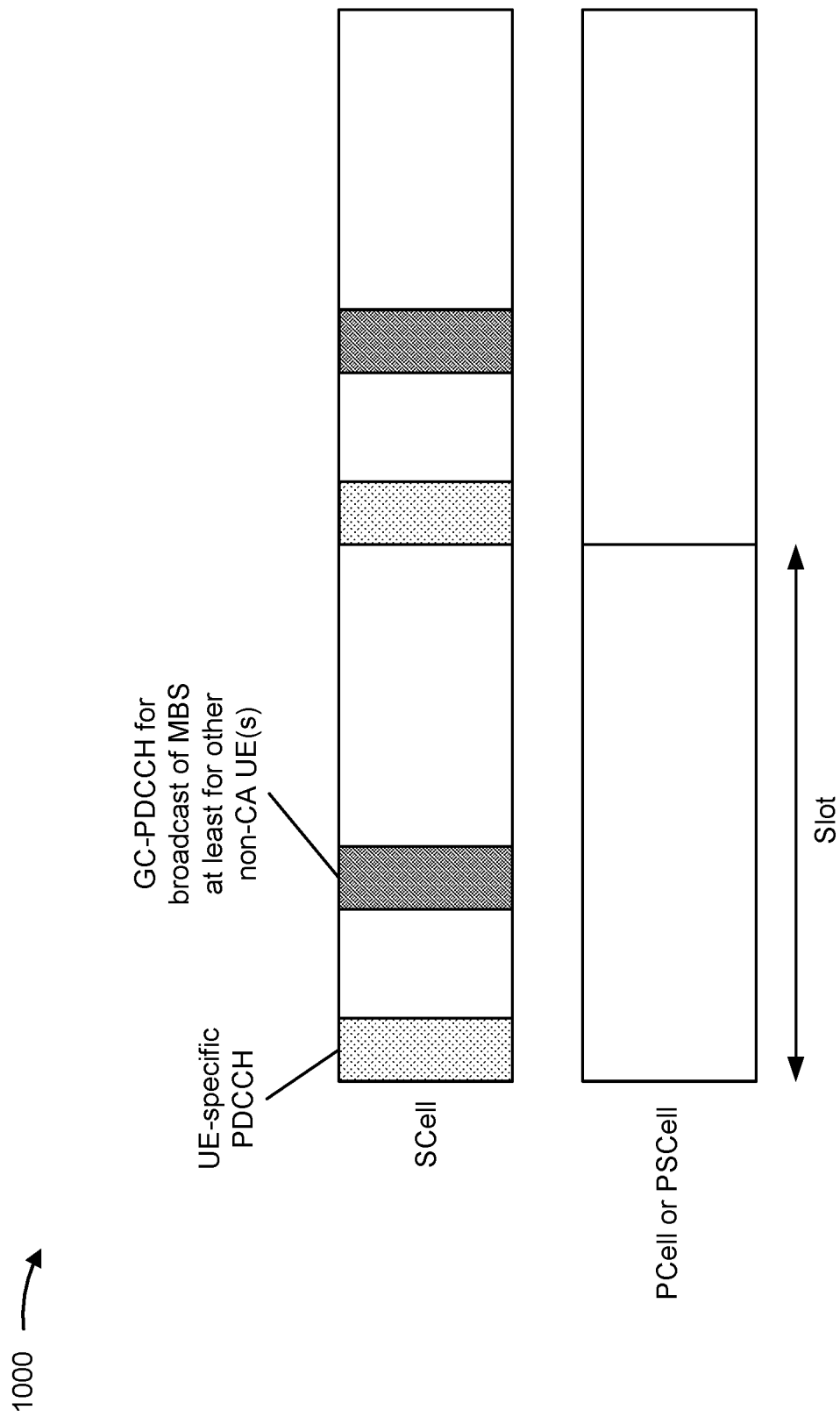
FIG. 10 is a diagram illustrating an example associated with an MBS on a secondary cell, in accordance with the present disclosure.

FIG. 10 is a diagram illustrating an example 1000 associated with an MBS on a secondary cell, in accordance with the present disclosure.

As shown in FIG. 10, a UE may be connected to a primary cell (PCell) or a primary secondary cell (PSCell) during a carrier aggregation. The UE may also be connected to an SCell during the carrier aggregation. A PDCCH monitoring occasion associated with a UE-specific PDCCH may be within a first three OFDM symbols of a slot associated with the SCell. A GC-PDCCH for a broadcast of an MBS may be received outside of the first three OFDM symbols of the slot associated with the SCell. The GC-PDCCH for the broadcast of the MBS may be at least for other non-CA UEs.

In some aspects, the UE may receive the UE-specific PDCCH in the slot via the SCell. The UE may receive, via the SCell, the GC-PDCCH for the broadcast of the MBS not within the first three symbols OFDM of the slot.

As indicated above, FIG. 10 is provided as an example. Other examples may differ from what is described with regard to FIG. 10.

Figure 11:
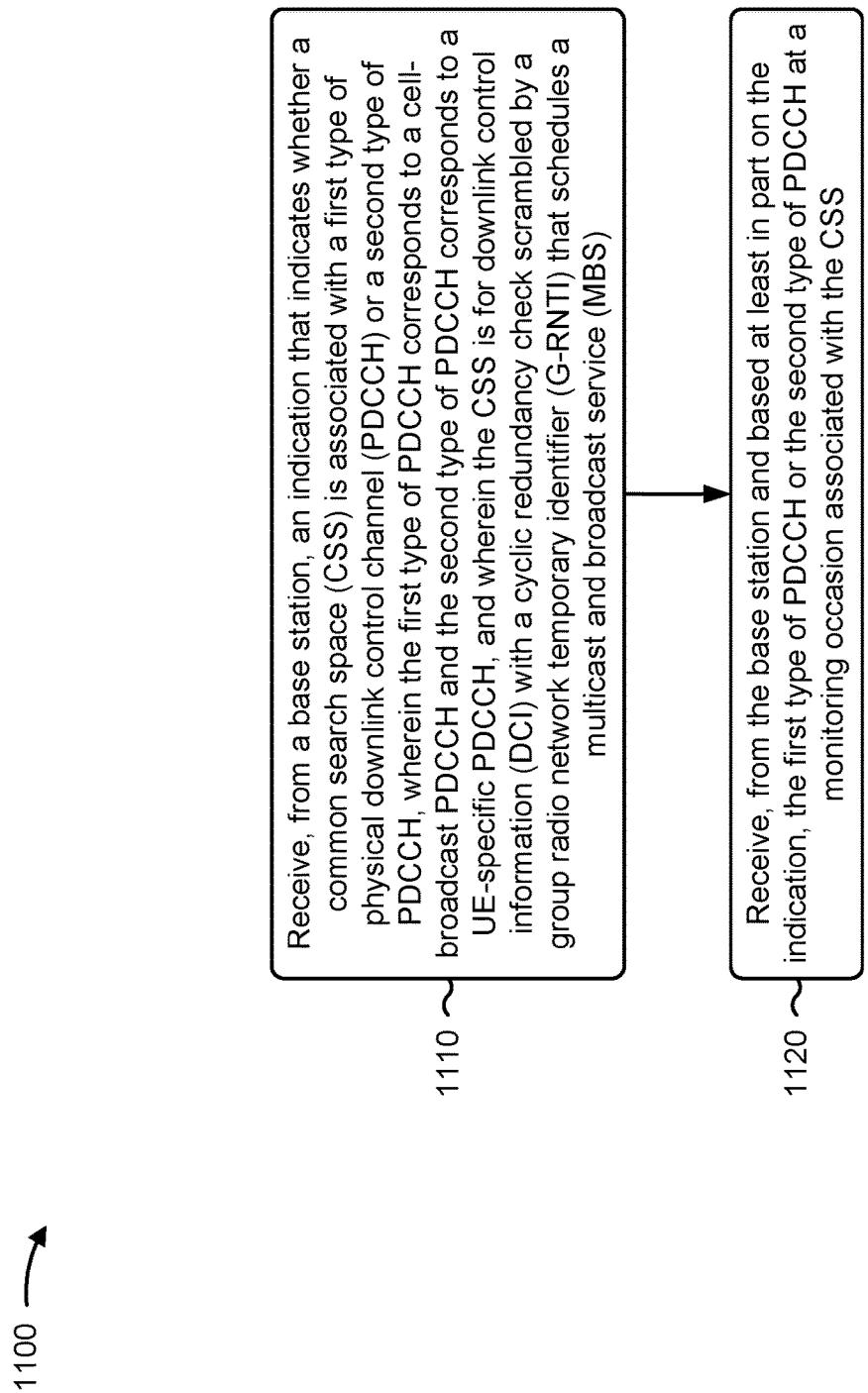
FIGS. 11-12 are diagrams illustrating example processes associated with receiving PDCCHs for MBSs at monitoring occasions, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with receiving PDCCHs for MBSs at monitoring occasions.

As shown in FIG. 11, in some aspects, process 1100 may include receiving, from a base station, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and the CSS is for DCI with a CRC scrambled by a G-RNTI that schedules an MBS (block 1110). For example, the UE (e.g., using communication manager 140 and/or reception component 1302, depicted in FIG. 13) may receive, from a base station, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and the CSS is for DCI with a CRC scrambled by a G-RNTI that schedules an MBS, as described above.

As further shown in FIG. 11, in some aspects, process 1100 may include receiving, from the base station and based at least in part on the indication, the first type of PDCCH or the second type of PDCCH at a monitoring occasion associated with the CSS (block 1120). For example, the UE (e.g., using communication manager 140 and/or reception component 1302, depicted in FIG. 13) may receive, from the base station and based at least in part on the indication, the first type of PDCCH or the second type of PDCCH at a monitoring occasion associated with the CSS, as described above.

Process 1100 may include additional aspects, such as any single aspect or any combination of aspects described below and/or in connection with one or more other processes described elsewhere herein.

In a first aspect, the indication indicates that the CSS is associated with the cell-broadcast PDCCH, wherein the monitoring occasion associated with the CSS is one or more symbols of a slot within a single span of three consecutive symbols within the slot; or the indication indicates that the CSS is associated with the UE-specific PDCCH, wherein the monitoring occasion associated with the CSS is within a first three symbols of a slot.

In a second aspect, alone or in combination with the first aspect, the CSS and the UE-specific PDCCH are configured to not be monitored within a slot.

In a third aspect, alone or in combination with one or more of the first and second aspects, the CSS and the UE-specific PDCCH are configured to be monitored within a slot in different spans of the slot, or the UE does not monitor either the CSS or the UE-specific PDCCH.

In a fourth aspect, alone or in combination with one or more of the first through third aspects, the CSS and the cell-broadcast PDCCH are configured to not be monitored within a slot.

In a fifth aspect, alone or in combination with one or more of the first through fourth aspects, the CSS and the cell-broadcast PDCCH are configured to be monitored within a slot in different spans of the slot, or the UE does not monitor either the CSS or the cell-broadcast PDCCH.

In a sixth aspect, alone or in combination with one or more of the first through fifth aspects, the indication indicates that the CSS is a first type of CSS associated with the cell-broadcast PDCCH or that the CSS is a second type of CSS associated with the UE-specific PDCCH, wherein the first type of CSS is associated with delivering a GC-PDCCH for a broadcast of an MBS and the second type of CSS is associated with delivering a GC-PDCCH for a multicast of the MBS, wherein the broadcast of the MBS is not associated with HARQ-ACK feedback or is received in an idle or inactive state, and the multicast of the MBS is associated with the HARQ-ACK feedback and is received in a connected state.

In a seventh aspect, alone or in combination with one or more of the first through sixth aspects, process 1100 includes monitoring, in an idle or inactive state, the GC-PDCCH for the broadcast of the MBS and not for the multicast of the MBS, or monitoring, in a connected state, up to two monitoring occasions within a slot, wherein the GC-PDCCH for the multicast of the MBS and a unicast PDCCH are within a same span or monitoring occasion.

In an eighth aspect, alone or in combination with one or more of the first through seventh aspects, the indication indicates that the CSS is associated with the cell-broadcast PDCCH and that a UE-specific search space is associated with the UE-specific PDCCH.

In a ninth aspect, alone or in combination with one or more of the first through eighth aspects, process 1100 includes receiving the UE-specific PDCCH in a slot via an SCell, and process 1100 further includes receiving, via the SCell, a group common PDCCH for a broadcast of an MBS not within a first three symbols of the slot.

In a tenth aspect, alone or in combination with one or more of the first through ninth aspects, process 1100 includes receiving, from the base station, system information or a broadcast RRC message or a common MAC-CE in an idle or inactive state, wherein the system information or the broadcast RRC message or the common MAC-CE indicates G-RNTIs for a broadcast of the MBS; receiving, from the base station in a connected state, a serving cell configuration associated with a dedicated RRC message, wherein the serving cell configuration indicates a CFR BWP configuration; receiving, from the base station in the connected state, G-RNTIs for a multicast of the MBS in one of a cell group configuration associated with a dedicated RRC message, the serving cell configuration associated with the dedicated RRC message, or the CFR BWP configuration; or receiving, from the base station in the connected state, the system information or the broadcast RRC message or the common MAC-CE that indicates the G-RNTIs for the broadcast of the MBS, and the serving cell configuration associated with the dedicated RRC message that includes the CFR BWP configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
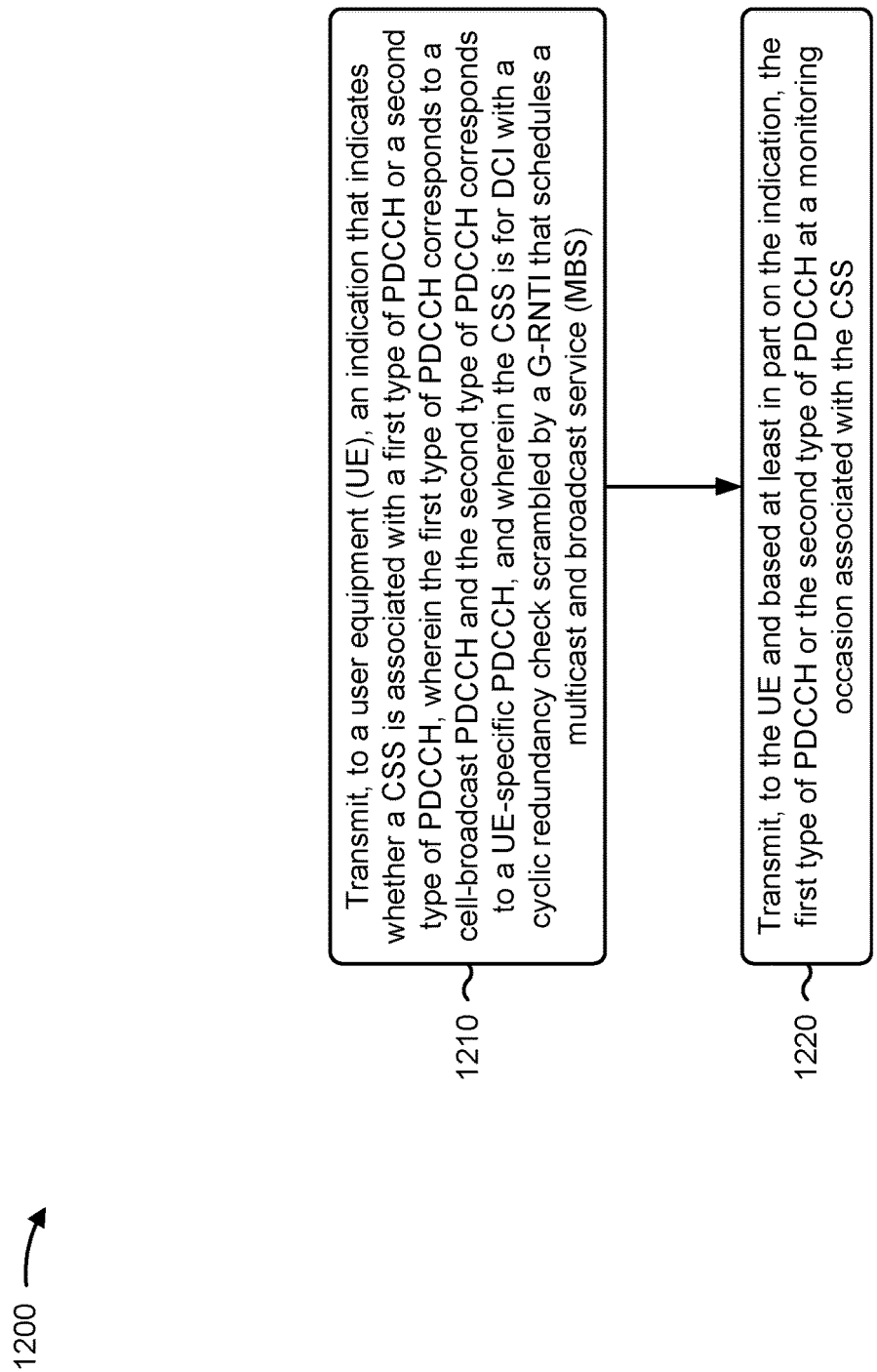

FIG. 12 is a diagram illustrating an example process 1200 performed, for example, by a base station, in accordance with the present disclosure. Example process 1200 is an example where the base station (e.g., base station 110) performs operations associated with receiving PDCCHs for MBSs at monitoring occasions.

As shown in FIG. 12, in some aspects, process 1200 may include transmitting, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and the CSS is for DCI with a CRC scrambled by a G-RNTI that schedules an MBS (block 1210). For example, the base station (e.g., using communication manager 150 and/or transmission component 14, depicted in FIG. 1404) may transmit, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and the CSS is for DCI with a CRC scrambled by a G-RNTI that schedules an MBS, as described above.

As further shown in FIG. 12, in some aspects, process 1200 may include transmitting, to the UE and based at least in part on the indication, the first type of PDCCH or the second type of PDCCH at a monitoring occasion associated with the CSS (block 1220). For example, the base station (e.g., using communication manager 150 and/or transmission component 1404, depicted in FIG. 14) may transmit, to the UE and based at least in part on the indication, the first type of PDCCH or the second type of PDCCH at a monitoring occasion associated with the CSS, as described above.

Process 1200 may include additional aspects, such as any single aspect or any combination of aspects described below and/or in connection with one or more other processes described elsewhere herein.

In a first aspect, the indication indicates that the CSS is associated with the cell-broadcast PDCCH, wherein a monitoring occasion associated with the CSS is one or more symbols of a slot within a single span of three consecutive symbols within the slot.

In a second aspect, alone or in combination with the first aspect, the indication indicates that the CSS is associated with the UE-specific PDCCH, wherein a monitoring occasion associated with the CSS is within a first three symbols of a slot.

In a third aspect, alone or in combination with one or more of the first and second aspects, the indication indicates that the CSS is a first type of CSS associated with the cell-broadcast PDCCH or that the CSS is a second type of CSS associated with the UE-specific PDCCH, wherein the first type of CSS is associated with delivering a GC-PDCCH for a broadcast of the MBS and the second type of CSS is associated with delivering a GC-PDCCH for a multicast of the MBS, wherein the broadcast of the MBS is not associated with HARQ-ACK feedback or is received in an idle or inactive state, and the multicast of the MBS is associated with the HARQ-ACK feedback and is received in a connected state.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
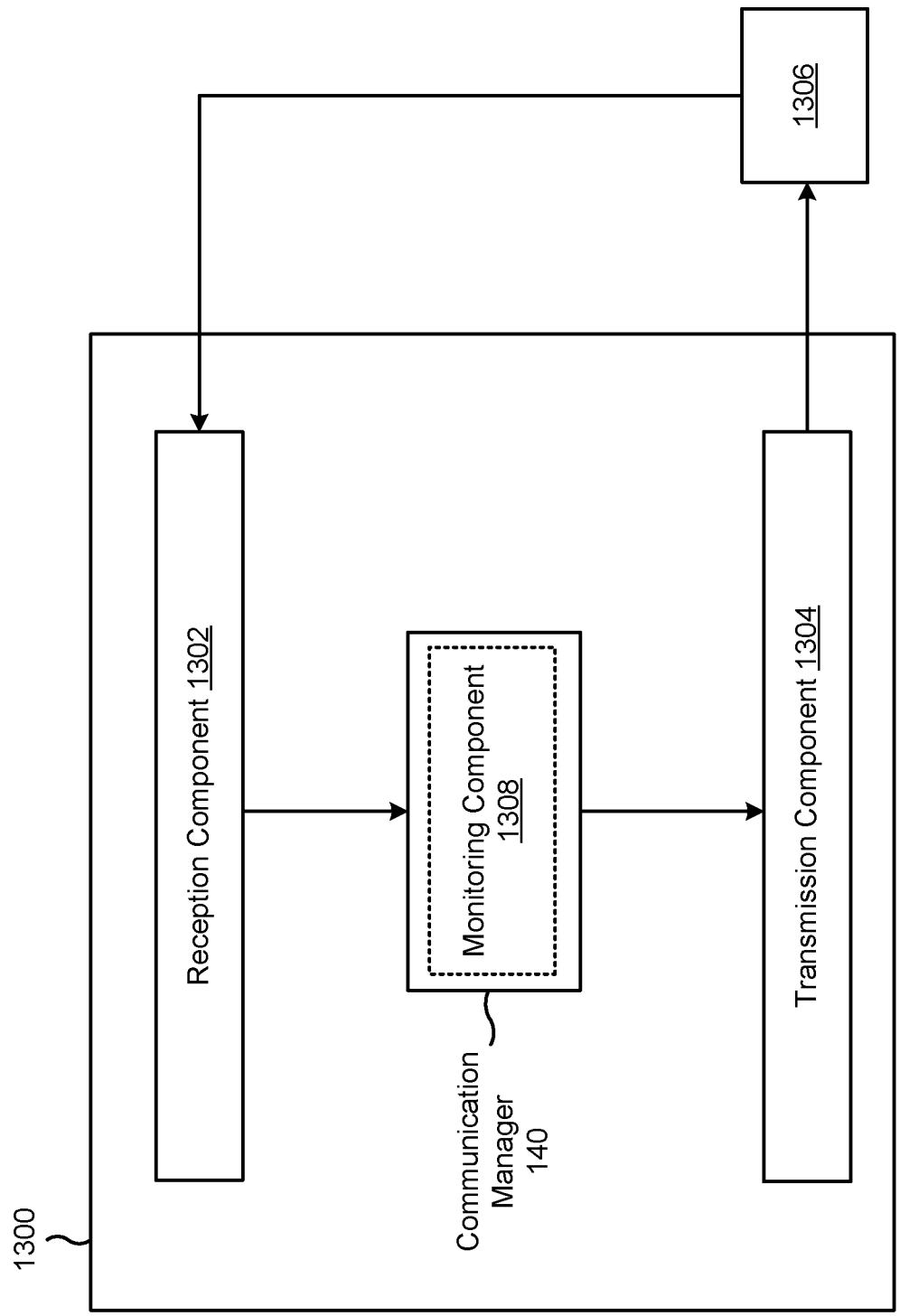
FIGS. 13-14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a monitoring component 1308, among other examples.

In some aspects, the apparatus 1300 may be configured to perform one or more operations described herein in connection with FIGS. 9-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive, from a base station, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and the CSS is for DCI with a CRC scrambled by a G-RNTI that schedules an MBS. The reception component 1302 may receive, from the base station and based at least in part on the indication, the first type of PDCCH or the second type of PDCCH at a monitoring occasion associated with the CSS.

The monitoring component 1308 may monitor, in an idle or inactive state, the GC-PDCCH for the broadcast of the MBS and not for the multicast of the MBS. The monitoring component 1308 may monitor, in a connected state, up to two monitoring occasions within a slot, wherein the GC-PDCCH for the multicast of the MBS and a unicast PDCCH are within a same span or monitoring occasion.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
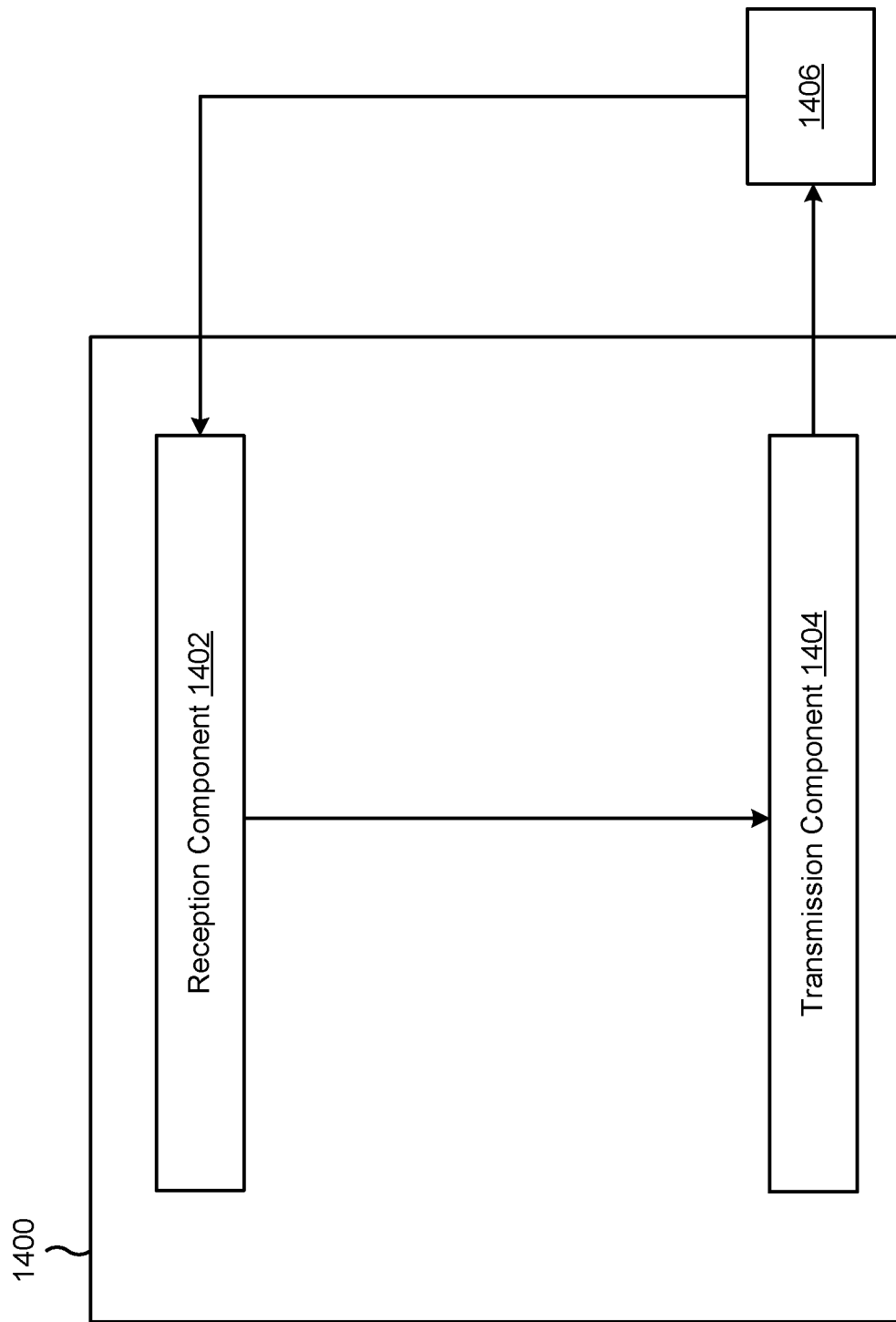

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 9-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit, to a UE, an indication that indicates whether a CSS is associated with a first type of PDCCH or a second type of PDCCH, wherein the first type of PDCCH corresponds to a cell-broadcast PDCCH and the second type of PDCCH corresponds to a UE-specific PDCCH, and the CSS is for DCI with a CRC scrambled by a G-RNTI that schedules an MBS. The transmission component 1404 may transmit, to the UE and based at least in part on the indication, the first type of PDCCH or the second type of PDCCH at a monitoring occasion associated with the CSS.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a base station, an indication that indicates whether a common search space (CSS) is associated with a first type of physical downlink control channel (PDCCH) or a second type of PDCCH, wherein the first type of PDCCH corresponds to a cell-broadcast PDCCH and the second type of PDCCH corresponds to a UE-specific PDCCH, and wherein the CSS is for downlink control information (DCI) with a cyclic redundancy check scrambled by a group radio network temporary identifier (G-RNTI) that schedules a multicast and broadcast service (MBS); and receiving, from the base station and based at least in part on the indication, the first type of PDCCH or the second type of PDCCH at a monitoring occasion associated with the CSS.

Aspect 2: The method of Aspect 1, wherein: the indication indicates that the CSS is associated with the cell-broadcast PDCCH, wherein the monitoring occasion associated with the CSS is one or more symbols of a slot within a single span of three consecutive symbols within the slot; or the indication indicates that the CSS is associated with the UE-specific PDCCH, wherein the monitoring occasion associated with the CSS is within a first three symbols of a slot.

Aspect 3: The method of any of Aspects 1 through 2, wherein the CSS and the UE-specific PDCCH are configured to not be monitored within a slot.

Aspect 4: The method of any of Aspects 1 through 3, wherein the CSS and the UE-specific PDCCH are configured to be monitored within a slot in different spans of the slot, or wherein the UE does not monitor either the CSS or the UE-specific PDCCH.

Aspect 5: The method of any of Aspects 1 through 4, wherein the CSS and the cell-broadcast PDCCH are configured to not be monitored within a slot.

Aspect 6: The method of any of Aspects 1 through 5, wherein the CSS and the cell-broadcast PDCCH are configured to be monitored within a slot in different spans of the slot, or wherein the UE does not monitor either the CSS or the cell-broadcast PDCCH.

Aspect 7: The method of any of Aspects 1 through 6, wherein the indication indicates that the CSS is a first type of CSS associated with the cell-broadcast PDCCH or that the CSS is a second type of CSS associated with the UE-specific PDCCH, wherein the first type of CSS is associated with delivering a group common PDCCH (GC-PDCCH) for a broadcast of the MBS and the second type of CSS is associated with delivering a GC-PDCCH for a multicast of the MBS, wherein the broadcast of the MBS is not associated with hybrid automatic repeat request acknowledgement (HARQ-ACK) feedback or is received in an idle or inactive state, and wherein the multicast of the MBS is associated with the HARQ-ACK feedback and is received in a connected state.

Aspect 8: The method of Aspect 7, further comprising: monitoring, in an idle or inactive state, the GC-PDCCH for the broadcast of the MBS and not for the multicast of the MBS; or monitoring, in a connected state, up to two monitoring occasions within a slot, wherein the GC-PDCCH for the multicast of the MBS and a unicast PDCCH are within a same span or monitoring occasion.

Aspect 9: The method of any of Aspects 1 through 8, wherein the indication indicates that the CSS is associated with the cell-broadcast PDCCH and that a UE-specific search space is associated with the UE-specific PDCCH.

Aspect 10: The method of any of Aspects 1 through 9, wherein receiving the UE-specific PDCCH comprises receiving the UE-specific PDCCH in a slot via a secondary cell (SCell); and further comprising receiving, via the SCell, a group common PDCCH for a broadcast of the MBS not within a first three symbols of the slot.

Aspect 11: The method of any of Aspects 1 through 10, further comprising: receiving, from the base station, system information or a broadcast radio resource control (RRC) message or a common medium access control element (MAC-CE) in an idle or inactive state, wherein the system information or the broadcast RRC message or the common MAC-CE indicates G-RNTIs for a broadcast of the MBS; receiving, from the base station in a connected state, a serving cell configuration associated with a dedicated RRC message, wherein the serving cell configuration indicates a common frequency resource (CFR) bandwidth part (BWP) configuration; receiving, from the base station in the connected state, G-RNTIs for a multicast of the MBS in one of a cell group configuration associated with a dedicated RRC message, the serving cell configuration associated with the dedicated RRC message, or the CFR BWP configuration; or receiving, from the base station in the connected state, the system information or the broadcast RRC message or the common MAC-CE that indicates the G-RNTIs for the broadcast of the MBS, and the serving cell configuration associated with the dedicated RRC message that includes the CFR BWP configuration.

Aspect 12: A method of wireless communication performed by a base station, comprising: transmitting, to a user equipment (UE), an indication that indicates whether a common search space (CSS) is associated with a first type of physical downlink control channel (PDCCH) or a second type of PDCCH, wherein the first type of PDCCH corresponds to a cell-broadcast PDCCH and the second type of PDCCH corresponds to a UE-specific PDCCH, and wherein the CSS is for downlink control information (DCI) with a cyclic redundancy check scrambled by a group radio network temporary identifier (G-RNTI) that schedules a multicast and broadcast service (MBS); and transmitting, to the UE and based at least in part on the indication, the first type of PDCCH or the second type of PDCCH at a monitoring occasion associated with the CSS.

Aspect 13: The method of Aspect 12, wherein the indication indicates that the CSS is associated with the cell-broadcast PDCCH, wherein a monitoring occasion associated with the CSS is one or more symbols of a slot within a single span of three consecutive symbols within the slot.

Aspect 14: The method of any of Aspects 12 through 13, wherein the indication indicates that the CSS is associated with the UE-specific PDCCH, wherein a monitoring occasion associated with the CSS is within a first three symbols of a slot.

Aspect 15: The method of any of Aspects 12 through 14, wherein the indication indicates that the CSS is a first type of CSS associated with the cell-broadcast PDCCH or that the CSS is a second type of CSS associated with the UE-specific PDCCH, wherein the first type of CSS is associated with delivering a group common PDCCH (GC-PDCCH) for a broadcast of the MBS and the second type of CSS is associated with delivering a GC-PDCCH for a multicast of the MBS, wherein the broadcast of the MBS is not associated with hybrid automatic repeat request acknowledgement (HARQ-ACK) feedback or is received in an idle or inactive state, and wherein the multicast of the MBS is associated with the HARQ-ACK feedback and is received in a connected state.

Aspect 16: An apparatus for wireless communication at a device, comprising a processor; memory coupled with the processor; and instructions stored in the memory and executable by the processor to cause the apparatus to perform the method of one or more of Aspects 1-11.

Aspect 17: A device for wireless communication, comprising a memory and one or more processors coupled to the memory, the one or more processors configured to perform the method of one or more of Aspects 1-11.

Aspect 18: An apparatus for wireless communication, comprising at least one means for performing the method of one or more of Aspects 1-11.

Aspect 19: A non-transitory computer-readable medium storing code for wireless communication, the code comprising instructions executable by a processor to perform the method of one or more of Aspects 1-11.

Aspect 20: A non-transitory computer-readable medium storing a set of instructions for wireless communication, the set of instructions comprising one or more instructions that, when executed by one or more processors of a device, cause the device to perform the method of one or more of Aspects 1-11.

Aspect 21: An apparatus for wireless communication at a device, comprising a processor; memory coupled with the processor; and instructions stored in the memory and executable by the processor to cause the apparatus to perform the method of one or more of Aspects 12-15.

Aspect 22: A device for wireless communication, comprising a memory and one or more processors coupled to the memory, the one or more processors configured to perform the method of one or more of Aspects 12-15.

Aspect 23: An apparatus for wireless communication, comprising at least one means for performing the method of one or more of Aspects 12-15.

Aspect 24: A non-transitory computer-readable medium storing code for wireless communication, the code comprising instructions executable by a processor to perform the method of one or more of Aspects 12-15.

Aspect 25: A non-transitory computer-readable medium storing a set of instructions for wireless communication, the set of instructions comprising one or more instructions that, when executed by one or more processors of a device, cause the device to perform the method of one or more of Aspects 12-15.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive, from a base station, an indication that indicates whether a common search space (CSS) is associated with a first type of physical downlink control channel (PDCCH) or a second type of PDCCH, wherein the first type of PDCCH corresponds to a cell-broadcast PDCCH and the second type of PDCCH corresponds to a UE-specific PDCCH, and wherein the CSS is for downlink control information (DCI) with a cyclic redundancy check scrambled by a radio network temporary identifier (RNTI), for a group of UEs, that schedules a multicast and broadcast service (MBS); and
receive, from the base station and based at least in part on the indication, the first type of PDCCH or the second type of PDCCH at a monitoring occasion associated with the CSS.

2. The apparatus of claim 1, wherein:
the indication indicates that the CSS is associated with the cell-broadcast PDCCH, wherein the monitoring occasion associated with the CSS is one or more symbols of a slot within a single span of three consecutive symbols within the slot; or
the indication indicates that the CSS is associated with the UE-specific PDCCH, wherein the monitoring occasion associated with the CSS is within a first three symbols of a slot.

3. The apparatus of claim 1, wherein the CSS and the UE-specific PDCCH are configured to not be monitored within a slot.

4. The apparatus of claim 1, wherein the CSS and the UE-specific PDCCH are configured to be monitored within a slot in different spans of the slot, or wherein the UE does not monitor either the CSS or the UE-specific PDCCH.

5. The apparatus of claim 1, wherein the CSS and the cell-broadcast PDCCH are configured to not be monitored within a slot.

6. The apparatus of claim 1, wherein the CSS and the cell-broadcast PDCCH are configured to be monitored within a slot in different spans of the slot, or wherein the UE does not monitor either the CSS or the cell-broadcast PDCCH.

7. The apparatus of claim 1, wherein the indication indicates that the CSS is a first type of CSS associated with the cell-broadcast PDCCH or that the CSS is a second type of CSS associated with the UE-specific PDCCH, wherein the first type of CSS is associated with delivering a group common PDCCH (GC-PDCCH) for a broadcast of the MBS and the second type of CSS is associated with delivering a GC-PDCCH for a multicast of the MBS, wherein the broadcast of the MBS is not associated with hybrid automatic repeat request acknowledgement (HARQ-ACK) feedback or is received in an idle or inactive state, and wherein the multicast of the MBS is associated with the HARQ-ACK feedback and is received in a connected state.

8. The apparatus of claim 7, wherein the one or more processors are further configured to:
monitor, in an idle or inactive state, the GC-PDCCH for the broadcast of the MBS and not for the multicast of the MBS; or
monitor, in a connected state, up to two monitoring occasions within a slot, wherein the GC-PDCCH for the multicast of the MBS and a unicast PDCCH are within a same span or monitoring occasion.

9. The apparatus of claim 1, wherein the indication indicates that the CSS is associated with the cell-broadcast PDCCH and that a UE-specific search space is associated with the UE-specific PDCCH.

10. The apparatus of claim 1, wherein the one or more processors, to receive the UE-specific PDCCH, are configured to receive the UE-specific PDCCH in a slot via a secondary cell (SCell); and
wherein the one or more processors are further configured to receive, via the SCell, a group common PDCCH for a broadcast of the MBS not within a first three symbols of the slot.

11. The apparatus of claim 1, wherein the one or more processors are further configured to:
receive, from the base station, system information or a broadcast radio resource control (RRC) message or a common medium access control element (MAC-CE) in an idle or inactive state, wherein the system information or the broadcast RRC message or the common MAC-CE indicates group RNTIs (G-RNTIs) for a broadcast of the MBS;
receive, from the base station in a connected state, a serving cell configuration associated with a dedicated RRC message, wherein the serving cell configuration indicates a common frequency resource (CFR) bandwidth part (BWP) configuration;
receive, from the base station in the connected state, G-RNTIs for a multicast of the MBS in one of a cell group configuration associated with a dedicated RRC message, the serving cell configuration associated with the dedicated RRC message, or the CFR BWP configuration; or
receive, from the base station in the connected state, the system information or the broadcast RRC message or the common MAC-CE that indicates the G-RNTIs for the broadcast of the MBS, and the serving cell configuration associated with the dedicated RRC message that includes the CFR BWP configuration.

12. An apparatus for wireless communication at a base station, comprising:
one or more memories; and
one or more processors, coupled to the one or more memories, configured to:
transmit, to a user equipment (UE), an indication that indicates whether a common search space (CSS) is associated with a first type of physical downlink control channel (PDCCH) or a second type of PDCCH, wherein the first type of PDCCH corresponds to a cell-broadcast PDCCH and the second type of PDCCH corresponds to a UE-specific PDCCH, and wherein the CSS is for downlink control information (DCI) with a cyclic redundancy check scrambled by a radio network temporary identifier (RNTI), for a group of UEs, that schedules a multicast and broadcast service (MBS); and transmit, to the UE and based at least in part on the indication, the first type of PDCCH or the second type of PDCCH at a monitoring occasion associated with the CSS.

13. The apparatus of claim 12, wherein the indication indicates that the CSS is associated with the cell-broadcast PDCCH, wherein the monitoring occasion associated with the CSS is one or more symbols of a slot within a single span of three consecutive symbols within the slot.

14. The apparatus of claim 12, wherein the indication indicates that the CSS is associated with the UE-specific PDCCH, wherein the monitoring occasion associated with the CSS is within a first three symbols of a slot.

15. The apparatus of claim 12, wherein the indication indicates that the CSS is a first type of CSS associated with the cell-broadcast PDCCH or that the CSS is a second type of CSS associated with the UE-specific PDCCH, wherein the first type of CSS is associated with delivering a group common PDCCH (GC-PDCCH) for a broadcast of the MBS and the second type of CSS is associated with delivering a GC-PDCCH for a multicast of the MBS, wherein the broadcast of the MBS is not associated with hybrid automatic repeat request acknowledgement (HARQ-ACK) feedback or is received in an idle or inactive state, and wherein the multicast of the MBS is associated with the HARQ-ACK feedback and is received in a connected state.

16. A method of wireless communication performed by a user equipment (UE), comprising:
receiving, from a base station, a serving cell configuration associated with a dedicated radio resource control (RRC) message, wherein the serving cell configuration indicates a common frequency resource (CFR) bandwidth part (BWP) configuration, and wherein the serving cell configuration is associated with a physical downlink control channel (PDCCH) configuration;
receiving, from the base station, an indication that indicates whether a common search space (CSS) is associated with a first type of PDCCH or a second type of PDCCH, wherein the first type of PDCCH corresponds to a cell-broadcast PDCCH and the second type of PDCCH corresponds to a UE-specific PDCCH, and wherein the CSS is for downlink control information (DCI) with a cyclic redundancy check scrambled by a radio network temporary identifier (RNTI), for a group of UEs, that schedules a multicast and broadcast service (MBS); and
receiving, from the base station and based at least in part on the indication, the first type of PDCCH or the second type of PDCCH at a monitoring occasion associated with the CSS.

17. The method of claim 16, wherein:
the indication indicates that the CSS is associated with the cell-broadcast PDCCH, wherein the monitoring occasion associated with the CSS is one or more symbols of a slot within a single span of three consecutive symbols within the slot; or
the indication indicates that the CSS is associated with the UE-specific PDCCH, wherein the monitoring occasion associated with the CSS is within a first three symbols of a slot.

18. The method of claim 16, wherein the CSS and the UE-specific PDCCH are not monitored within a slot.

19. The method of claim 16, wherein the CSS and the UE-specific PDCCH are monitored within a slot in different spans of the slot, or wherein either the CSS or the UE-specific PDCCH is not monitored.

20. The method of claim 16, wherein the CSS and the cell-broadcast PDCCH are monitored within a slot.

21. The method of claim 16, wherein the CSS and the cell-broadcast PDCCH are monitored within a slot in different spans of the slot, or wherein either the CSS or the cell-broadcast PDCCH is not monitored.

22. The method of claim 16, wherein the indication indicates that the CSS is a first type of CSS associated with the cell-broadcast PDCCH or that the CSS is a second type of CSS associated with the UE-specific PDCCH, wherein the first type of CSS is associated with delivering a group common PDCCH (GC-PDCCH) for a broadcast of the MBS and the second type of CSS is associated with delivering a GC-PDCCH for a multicast of the MBS, wherein the broadcast of the MBS is not associated with hybrid automatic repeat request acknowledgement (HARQ-ACK) feedback or is received in an idle or inactive state, and wherein the multicast of the MBS is associated with the HARQ-ACK feedback and is received in a connected state.

23. The method of claim 22, further comprising:
monitoring, in an idle or inactive state, the GC-PDCCH for the broadcast of the MBS and not for the multicast of the MBS; or
monitoring, in a connected state, up to two monitoring occasions within a slot, wherein the GC-PDCCH for the multicast of the MBS and a unicast PDCCH are within a same span or monitoring occasion.

24. The method of claim 16, wherein the indication indicates that the CSS is associated with the cell-broadcast PDCCH and that a UE-specific search space is associated with the UE-specific PDCCH.

25. The method of claim 16, wherein receiving the UE-specific PDCCH comprises receiving the UE-specific PDCCH in a slot via a secondary cell (SCell); and
wherein the method further comprises receiving, via the SCell, a group common PDCCH for a broadcast of the MBS not within a first three symbols of the slot.

26. The method of claim 16, further comprising:
receiving, from the base station, system information or a broadcast RRC message or a common medium access control element (MAC-CE) in an idle or inactive state, wherein the system information or the broadcast RRC message or the common MAC-CE indicates group RNTIs (G-RNTIs) for a broadcast of the MBS;
receiving, from the base station, G-RNTIs for a multicast of the MBS in one of a cell group configuration associated with a dedicated RRC message, the serving cell configuration associated with the dedicated RRC message, or the CFR BWP configuration; or
receiving, from the base station, the system information or the broadcast RRC message or the common MAC-CE that indicates the G-RNTIs for the broadcast of the MBS, and the serving cell configuration associated with the dedicated RRC message that includes the CFR BWP configuration.

27. A method of wireless communication performed by a base station, comprising:
transmitting, to a user equipment (UE), an indication that indicates whether a common search space (CSS) is associated with a first type of physical downlink control channel (PDCCH) or a second type of PDCCH, wherein the first type of PDCCH corresponds to a cell-broadcast PDCCH and the second type of PDCCH corresponds to a UE-specific PDCCH, and wherein the CSS is for downlink control information (DCI) with a cyclic redundancy check scrambled by a radio network temporary identifier (RNTI), for a group of UEs, that schedules a multicast and broadcast service (MBS); and transmitting, to the UE and based at least in part on the indication, the first type of PDCCH or the second type of PDCCH at a monitoring occasion associated with the CSS.

28. The method of claim 27, wherein the indication indicates that the CSS is associated with the cell-broadcast PDCCH, wherein the monitoring occasion associated with the CSS is one or more symbols of a slot within a single span of three consecutive symbols within the slot.

29. The method of claim 27, wherein the indication indicates that the CSS is associated with the UE-specific PDCCH, wherein the monitoring occasion associated with the CSS is within a first three symbols of a slot.

30. The method of claim 27, wherein the indication indicates that the CSS is a first type of CSS associated with the cell-broadcast PDCCH or that the CSS is a second type of CSS associated with the UE-specific PDCCH, wherein the first type of CSS is associated with delivering a group common PDCCH (GC-PDCCH) for a broadcast of the MBS and the second type of CSS is associated with delivering a GC-PDCCH for a multicast of the MBS, wherein the broadcast of the MBS is not associated with hybrid automatic repeat request acknowledgement (HARQ-ACK) feedback or is received in an idle or inactive state, and wherein the multicast of the MBS is associated with the HARQ-ACK feedback and is received in a connected state.

* * * * *